US012006889B2

(12) United States Patent
Christensen et al.

(10) Patent No.: US 12,006,889 B2
(45) Date of Patent: Jun. 11, 2024

(54) ENGINE CONTROL SYSTEM AND METHODS

(71) Applicant: Arctic Cat Inc., Thief River Falls, MN (US)

(72) Inventors: Cord Miller Christensen, Goodridge, MN (US); Alexander Konrad Fuhrman, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

(21) Appl. No.: 16/989,308

(22) Filed: Aug. 10, 2020

(65) Prior Publication Data

US 2021/0040907 A1 Feb. 11, 2021

Related U.S. Application Data

(60) Provisional application No. 62/884,925, filed on Aug. 9, 2019.

(51) Int. Cl.
*F02D 41/08* (2006.01)
*F02B 33/04* (2006.01)
(Continued)

(52) U.S. Cl.
CPC .............. *F02D 41/08* (2013.01); *F02B 33/04* (2013.01); *F02B 33/28* (2013.01);
(Continued)

(58) Field of Classification Search
CPC .. F02D 13/02; F02D 13/0242; F02D 41/0007; F02D 41/009; F02D 41/086;
(Continued)

(56) References Cited

U.S. PATENT DOCUMENTS 5,146,899 A * 9/1992 Tanaka .................... F02D 41/28 123/478
5,345,897 A 9/1994 Inder et al.
(Continued)

OTHER PUBLICATIONS

Office Action dated Oct. 4, 2023, for Application No. 3,123,439, 4 pages.
(Continued)

*Primary Examiner* — John Kwon
*Assistant Examiner* — Johnny H Hoang
(74) *Attorney, Agent, or Firm* — Billion & Armitage

(57) ABSTRACT

Embodiments describe a method of controlling a two-stroke internal combustion engine is shown. The method includes selecting one set of two or more sets of engine parameter inputs or a weighted value of two or more sets of engine parameter inputs, determining an engine output parameter from the selection, and utilizing the determined engine output parameter to control one or more engine operations; re-selecting one set of two or more sets of engine parameter inputs or a weighted value of two or more sets of engine parameter inputs during engine operation, utilizing the reselected output parameters to adjust one or more engine operations. Each set of engine parameter inputs includes a direct measurement of crankcase pressure and engine speed and optionally one or more of barometric pressure, exhaust valve position, air temperature, engine coolant temperature, exhaust temperature, boost pressure, crankshaft position and direction of rotation, humidity, fuel pressure, fuel temperature, detonation sensor level, exhaust oxygen content, and throttle valve angle.

22 Claims, 20 Drawing Sheets

(51) Int. Cl.
*F02B 33/28* (2006.01)
*F02D 13/02* (2006.01)
*F02D 41/00* (2006.01)
*F02D 41/30* (2006.01)
*F02P 9/00* (2006.01)

(52) U.S. Cl.
CPC ..... *F02D 13/0242* (2013.01); *F02D 41/0007* (2013.01); *F02D 41/009* (2013.01); *F02D 41/086* (2013.01); *F02D 41/30* (2013.01); *F02P 9/00* (2013.01); *F02D 2200/021* (2013.01); *F02D 2200/0404* (2013.01); *F02D 2200/0602* (2013.01); *F02D 2200/0614* (2013.01); *F02D 2200/08* (2013.01); *F02D 2200/101* (2013.01); *F02D 2200/703* (2013.01); *F02D 2400/04* (2013.01)

(58) Field of Classification Search
CPC ............... F02D 41/30; F02D 2200/021; F02D 2200/0404; F02D 2200/0602; F02D 2200/0614; F02D 2200/08; F02D 2200/101; F02D 2200/703; F02D 2400/04; F02B 33/04; F02B 33/28; F02P 9/00
See application file for complete search history.

(56) References Cited

U.S. PATENT DOCUMENTS 5,404,843 A * 4/1995 Kato ........................ F02D 41/32 123/73 B
5,441,030 A 8/1995 Satsukawa
6,474,298 B2 * 11/2002 Kanno ................. F02M 35/167 123/339.14
6,640,774 B2 11/2003 Betz et al.
6,975,936 B2 * 12/2005 Akuzawa .............. G01M 15/09 701/115
7,536,983 B2 * 5/2009 Layher .................... F02B 33/04 73/114.34
8,555,831 B2 * 10/2013 Paa ......................... F02B 25/00 123/73 A
9,562,485 B1 * 2/2017 Nieman .............. F02D 41/0097
10,859,027 B2 12/2020 Blake
2004/0002810 A1 * 1/2004 Akuzawa ................ F02D 41/22 701/114
2004/0149272 A1 * 8/2004 Kurtz .................. F02B 23/0696 123/568.21
2004/0149274 A1 * 8/2004 Kurtz ..................... F02D 41/405 123/295
2010/0100299 A1 * 4/2010 Tripathi .............. F02D 41/0087 701/102
2010/0222985 A1 * 9/2010 Yun ..................... F02D 41/3041 123/295
2011/0213540 A1 * 9/2011 Tripathi .................. F02D 17/02 701/102
2015/0369157 A1 * 12/2015 Lehmen ................ F02D 41/064 701/105
2018/0058367 A1 * 3/2018 Ottikkutti ............. F02D 41/403
2018/0080404 A1 * 3/2018 Nair ........................ G01P 21/02
2018/0347496 A1 12/2018 Moine
2019/0010107 A1 4/2019 Blake
2020/0182123 A1 6/2020 Buchwitz et al.
2020/0182130 A1 6/2020 Hedlund et al.
2020/0182138 A1 6/2020 Buchwitz et al.
2020/0182139 A1 6/2020 Buchwitz et al.
2020/0182140 A1 6/2020 Buchwitz et al.
2020/0182141 A1 6/2020 Buchwitz et al.
2020/0182142 A1 6/2020 Zimney et al.
2020/0182164 A1 6/2020 Buchwitz et al.
2020/0182167 A1 6/2020 Buchwitz et al.
2020/0284217 A1 * 9/2020 Hakeem .............. F02D 13/0257
2020/0291886 A1 * 9/2020 Pursifull ............. F02D 41/3809
2021/0040907 A1 2/2021 Christensen et al.

OTHER PUBLICATIONS

Office Action dated Aug. 24, 2023, for Application No. 3,089,523, 3 Pages.
"Office Action Mailed for Application No. 3,089,523, mailed on Apr. 10, 2024", 4 Pages.

* cited by examiner

ENGINE CONTROL SYSTEM AND METHODS

BACKGROUND

A two-stroke internal combustion engine utilizes a cylinder in which a combustion chamber is formed. Within the cylinder, a reciprocating piston drives a crankshaft rotatably supported within a crankcase. An air intake passage fluidly connects to the crankcase for drawing in air. An exhaust passage is fluidly connected to the cylinder for expelling waste after combustion. A control device, such as an engine control unit (ECU), controls at least some engine functions, such as fuel injection amount and angle, and ignition timing, for example Modern two-stroke engines often utilize throttle valve position as an input for the ECU to control engine operations. However, this input does not take into account changes in engine inlet pressure and engine variation, among other inefficiencies. In high performance engines and especially engines that utilize a boosting system (such as a turbocharger), relying solely on throttle valve position for engine control leads to underperformance, inefficiency, and poor emissions.

SUMMARY

In some embodiments, a method of controlling a two-stroke internal combustion engine is shown. The method includes selecting one set of two or more sets of engine parameter inputs or a weighted value of two or more sets of engine parameter inputs, determining an engine output parameter from the selection, and utilizing the determined engine output parameter to control one or more engine operations; re-selecting one set of two or more sets of engine parameter inputs or a weighted value of two or more sets of engine parameter inputs during engine operation, utilizing the reselected output parameters to adjust one or more engine operations. Each set of engine parameter inputs includes a direct measurement of crankcase pressure and engine speed and optionally one or more of barometric pressure, exhaust valve position, air temperature, engine coolant temperature, exhaust temperature, boost pressure, crankshaft position and direction of rotation, humidity, fuel pressure, fuel temperature, detonation sensor level, exhaust oxygen content, and throttle valve angle.

In some embodiments, a method of controlling a two-stroke internal combustion engine includes measuring engine speed, measuring a direct crankcase pressure, selecting one set of two or more sets of engine parameter inputs or a weighted value of two or more sets of engine parameter inputs, determining an engine output parameter from the selection; and utilizing the determined engine output parameter to control one or more engine operations; and re-selecting one set of two or more sets of engine parameter inputs or a weighted value of two or more sets of engine parameter inputs during engine operation, utilizing the reselected output parameters to adjust one or more engine operations. Each set of engine parameter inputs includes a measurement of engine speed and crankcase pressure, and one or more of barometric pressure, exhaust valve position, air temperature, engine coolant temperature, exhaust temperature, boost pressure, crankshaft position and direction of rotation, humidity, fuel pressure, fuel temperature, detonation sensor level, exhaust oxygen content, and throttle valve angle.

In an embodiment, a two-stroke internal combustion engine system includes a crankcase including a piston and crankshaft, an ignition system in contact with a combustion chamber within the cylinder, a fuel injection system in fluid contact with the combustion chamber, an air intake passage fluidly coupled with the crankcase, an exhaust passage fluidly coupled with the cylinder, an air intake valve positioned within the air intake passage, an exhaust valve positioned within the exhaust passage, one or more pressure sensors positioned within the crankcase, one or more pressure sensors positioned within air intake passage, a turbocharger fluidly connected to both the air intake passage and exhaust passage, and an engine control unit for controlling the engine. The one or more pressure sensors includes an absolute pressure sensor position to measure pressure during a compression cycle, or phase, of the crankcase.

BRIEF DESCRIPTION OF DRAWINGS

This written disclosure describes illustrative embodiments that are non-limiting and non-exhaustive. Reference is made to illustrative embodiments that are depicted in the figures, in which.

DETAILED DESCRIPTION

Figure 1:
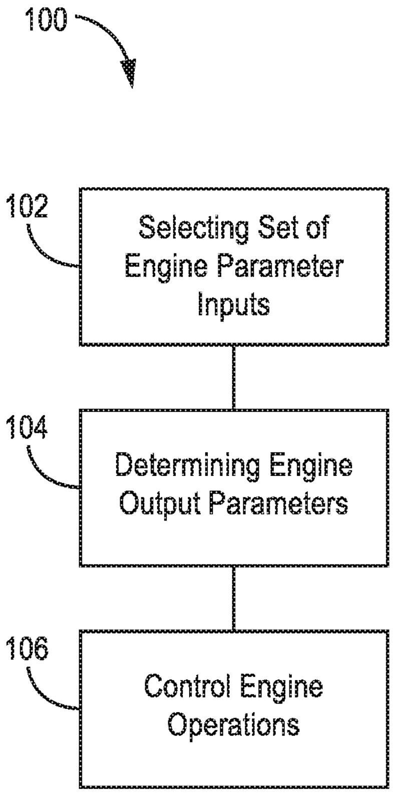
FIG. 1 illustrates a flow chart diagram 100 of a method of controlling a two-stroke internal combustion engine, according to some embodiments of this disclosure.

Embodiments of the present disclosure describe methods of controlling a two-stroke internal combustion engine, in either forward or reverse crankshaft rotation direction. Embodiments herein adapt an engine to environmental and manufacturing variations to optimize engine operations. On a crankcase scavenged two-stroke engine all air mass entering the engine must travel through the crankcase, therefore by measuring the crankcase pressure of the engine, the engine load can more accurately be determined. In some embodiments, the crankcase pressure may be used as a direct measure of engine load instead of as correction factor to an indirect measure of engine load (i.e. throttle position). This is especially important for applications in which boosted air is entering the crankcase (i.e., turbocharged). The additional airflow created by the boost renders traditional measurements inaccurate or delayed. If inaccurate or delayed information is communicated to an engine control unit, the engine run less efficiently and with less performance A direct pressure measurement can be combined with additional inputs, such as a pre-throttle pressure measurement, to enable boost pressure control via wastegate valve and air bypass valve control. Even in naturally aspirated applications, the measurement analysis herein creates greater engine efficiencies. Referring to FIG. 1, flow chart diagram 100 of a method of controlling a two-stroke internal combustion engine is shown, according to some embodiments of this disclosure. One set of two or more sets of engine parameter inputs or a weighted value of two or more sets of engine parameter inputs are selected 102. From the selection, an engine output parameter is determined 104. The determined engine output parameter is utilized 106 to control one or more engine operations. Engine parameter inputs include one or more of engine speed, barometric pressure, crankcase pressure, exhaust valve position, air temperature, engine coolant temperature, exhaust temperature, boost pressure, crankshaft position and direction of rotation, humidity, fuel pressure, fuel temperature, detonation sensor level, exhaust oxygen content, and throttle valve angle. Engine speed may be measured via a crankshaft position sensor, for example. Barometric pressure measures atmospheric pressure and may be measured via a pressure sensor located outside the crankcase, or located outside of the air intake passage, for example. Crankcase pressure may be measured within the crankcase with an absolute pressure sensor, for example. Exhaust valve position and throttle valve angle include measurements of the valve's position as open, closed or in some position in between open or closed. The throttle valve position may be mechanically or electrically controlled, for example. Inlet air temperature may be measured via a temperature sensor located within the air intake passage. Engine coolant temperature may be measured via a temperature sensor located within the engine coolant system. Exhaust temperature may be measured via a temperature sensor located within the exhaust passage. Boost pressure may be measured via an absolute pressure sensor located within the pressurized portion of the air intake passage, for example. Crankshaft position and direction of rotation may be measured by one or more crankshaft position sensors. Humidity may be measured by a humidity sensor located within the air intake passage. Fuel pressure may be measure by a pressure located within the pressurized portion of the fuel system. A set of engine parameter inputs includes two or more of the engine parameter inputs. In one embodiment, a set of engine parameter inputs includes a measurement of engine speed and one or more of barometric pressure, crankcase pressure, exhaust valve position, air temperature, engine coolant temperature, exhaust temperature, boost pressure, crankshaft position and direction of rotation, humidity, fuel pressure, fuel temperature, detonation sensor level, exhaust oxygen content, and throttle valve angle. Sets of engine parameter inputs can be determined prior to engine operation and programmed into the ECU. Each set of engine parameter inputs may be optimal to utilize under different engine conditions, environmental conditions, or in response to user input. Each set of inputs can be selected 102 individually or a weighted combination of two or more sets of measurements can be considered. The selection 102 can be done by an engine control unit, for example. Selecting 102 can be in response to pre-programmed reference values, such as engine speed. Alternatively, selecting 102 can be in response to an analysis of collected data points over a time period.

In one embodiment, and prior to the selecting 102 one set of two or more sets, the step of selecting driving fuel control or idle fuel control may be determined. Selecting driving fuel control or idle fuel control can include determining one or more initial input values, comparing the one or more initial input values to one or more reference values, sufficient to determine whether the engine is in a drive mode or idle mode, and then selecting driving fuel control or idle fuel control. The one or more initial input values may include throttle valve angle, for example. The one or more reference value may include reference throttle valve positions. Selecting includes communicating with an engine control unit that the engine is either in idle mode or in drive mode. Whether the engine is in idle mode or driving mode may influence the selection 102 of which set or weight of sets of engine parameter inputs. Whether the engine is in idle mode or driving mode may affect which measurement module the ECU follows.

After selecting 102, the ECU may re-select one set of two or more sets of engine parameter inputs or a weighted value of two or more sets of engine parameter inputs during engine operation and then utilize the reselected output parameters to adjust or control one or more engine operations. The reselection may the same inputs as originally selected if the parameters have not changed such that a change in analysis is warranted. A change in parameters during engine operation may trigger a reselection of inputs, or adjust the weight of inputs or switch control methods.

The engine output parameter may include one or more of fuel injection amount, fuel injection angle, ignition angle, and exhaust valve position. Additional engine output parameters may include boost pressure (e.g., from a turbocharger or supercharger application), wastegate duty, air bypass valve, fuel pressure, target torque, and throttle position. The fuel injection amount includes a mass of fuel to be injected into the combustion chamber, cylinder, crankcase and/or air inlet passage. The fuel injection angle refers to the timing of the fuel injection into the combustion chamber, cylinder, crankcase and or air inlet passage in relation to crankshaft position. The ignition angle includes timing of the firing of the spark plug in relation to the crankshaft position, in order to optimize the combustion cycle. Exhaust valve position, as an output, controls the position of the exhaust valve to increase performance and reduce emissions in optimizing the amount or timing of exhaust air released and unspent fuel/air mixture retained in the combustion chamber.

The engine operations that may ultimately be adjusted and controlled by the ECU may include one or more of injecting fuel mass, adjusting injection fuel angle, adjusting exhaust valve position, firing spark plug, fuel pressure, boost pressure, wastegate position, bypass valve position, and adjusting exhaust valve position. For example, from a determined 104 fuel injection amount, this information is utilized to control 106 fuel injection into the engine.

Figure 2A:
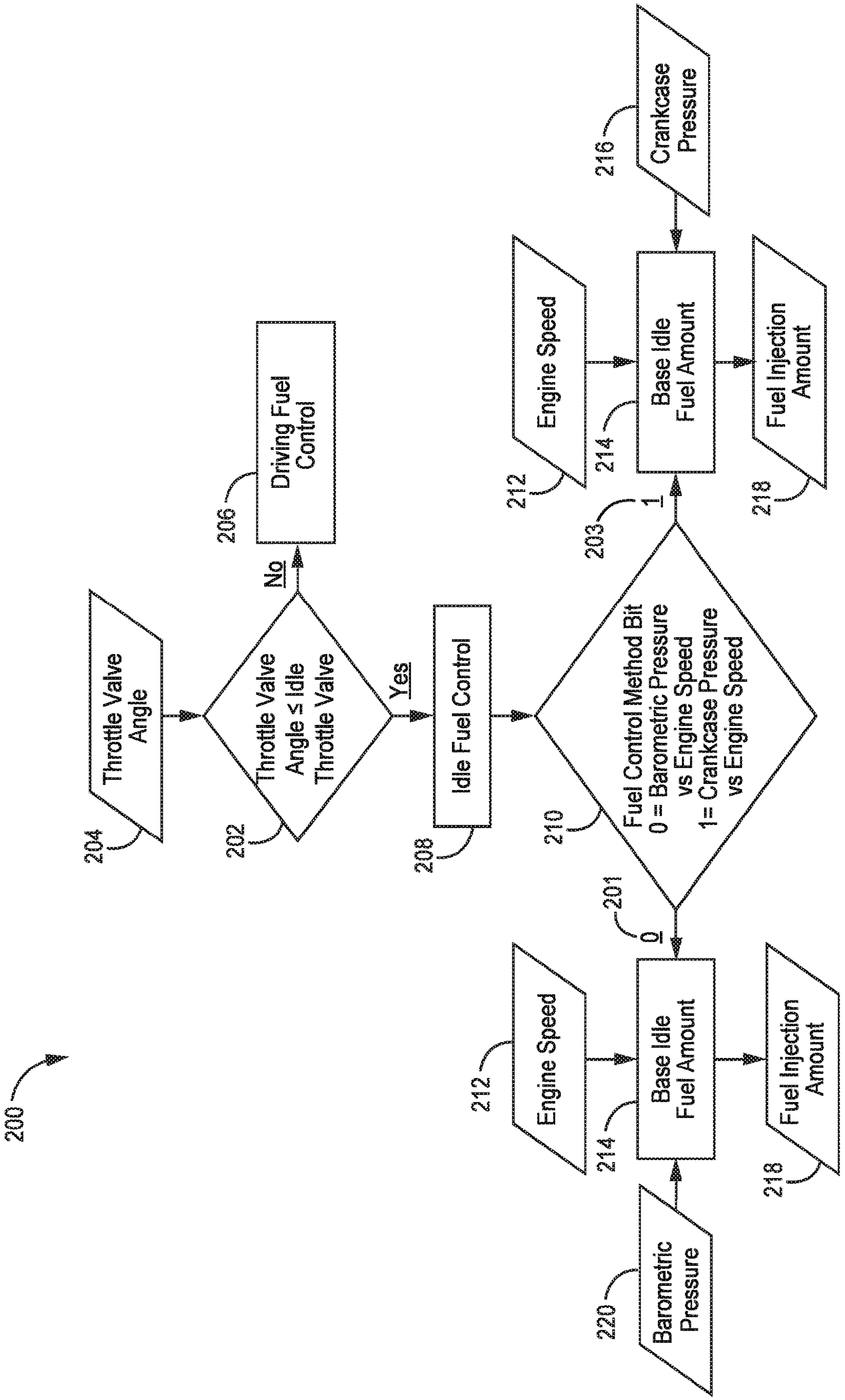
FIGS. 2A-B illustrates flow chart diagrams 200, 202 of a method of controlling a two-stroke internal combustion engine, according to some embodiments of this disclosure.

Referring to FIG. 2A, a flow chart diagram 200 of a method of controlling a two-stroke internal combustion engine is shown, according to some embodiments of this disclosure. An initial input value, such as throttle valve angle 204 can be measured. The initial input is compared 202 by the ECU to a reference position. In this example, current throttle valve angle or position 204 is compared to the reference throttle valve angle to determine if the engine is in drive mode or idle mode. If in drive mode, the ECU follows the analysis of the driving fuel control module 206. If in idle mode, the ECU follows the analysis of the idle fuel control module 208. In this embodiment, the ECU selects between one of two sets 201, 203 of engine parameter inputs. The selection of one set over the other set can be based on a current, pre-determined input value, such as engine speed or throttle valve angle, or based on an analysis of collected data points over a time period. The selection between sets 201, 203 can be a binary choice based on a certain condition, can utilize a weighted combination of the two, or switch from one set to the other set based on pre-determined or real time parameters. The time period could be 0.1-10 seconds, 5 seconds to 30 seconds, 10 seconds to 2 minutes, for example. In one embodiment, the ECU may analyze both set one and set two over a time period and compare results for consistency, variance from expected reference values, or in response to user input and then make a selection. For example, a binary choice between sets is shown in Table 1. As engine speed increases, the control method switches at 4000 RPM in this example.

TABLE 1

| Column 1<br>Column 2 | | Engine Speed<br>Weighting factor |
|---|---|---|
| 1000 | 0 | Weighting factor between control methods by RPM |
| 2000 | 0 | |
| 2500 | 0 | |
| 3000 | 0 | |
| 4000 | 1 | |
| 4500 | 1 | |
| 5000 | 1 | |
| 5200 | 1 | |
| 5400 | 1 | |

TABLE 1-continued

| Column 1<br>Column 2 | | Engine Speed<br>Weighting factor |
|---|---|---|
| 5600 | 1 | |
| 5800 | 1 | |
| 6000 | 1 | |
| 6200 | 1 | |
| 6400 | 1 | |
| 6600 | 1 | |
| 6800 | 1 | |
| 7000 | 1 | |
| 7200 | 1 | |
| 7400 | 1 | |
| 7600 | 1 | |
| 7800 | 1 | |
| 8000 | 1 | |
| 8200 | 1 | |
| 8400 | 1 | |

In Table 2, weighting factors between control methods by throttle valve angle versus engine speed is show in an example. Table 3 shows weighting factors between control methods by crankcase pressure and engine speed.

TABLE 2

| X-Axis<br>Y-Axis<br>Z-Axis | Crankcase Pressure (mmHg)<br>Engine Speed<br>Weighting Factor | | | | Weighting factor<br>between control methods<br>by crankcase pressure | | | | |
|---|---|---|---|---|---|---|---|---|---|
| | 200 | 300 | 400 | 500 | 600 | 800 | 1000 | 1200 | 1400 |
| 1000 | 0 | 0 | 0 | 0 | 0 | 0 | 0 | 0 | 0 |
| 2000 | 0 | 0 | 0 | 0 | 0 | 0 | 0 | 0 | 0 |
| 2500 | 0 | 0 | 0.8 | 0 | 0 | 0 | 0 | 0 | 0 |
| 3000 | 0 | 0 | 0.8 | 0.8 | 0.8 | 0.8 | 0.8 | 0.8 | 0.8 |
| 4000 | 0 | 0 | 0.8 | 1 | 1 | 1 | 1 | 1 | 1 |
| 4500 | 0 | 0 | 0.8 | 1 | 1 | 1 | 1 | 1 | 1 |
| 5000 | 0 | 0 | 0.8 | 1 | 1 | 1 | 1 | 1 | 1 |
| 5200 | 0 | 0 | 0.8 | 1 | 1 | 1 | 1 | 1 | 1 |
| 5400 | 0 | 0.8 | 0.8 | 1 | 1 | 1 | 1 | 1 | 1 |
| 5600 | 0 | 0.8 | 0.8 | 1 | 1 | 1 | 1 | 1 | 1 |
| 5800 | 0 | 0.8 | 0.8 | 1 | 1 | 1 | 1 | 1 | 1 |
| 6000 | 0 | 0.8 | 0.8 | 1 | 1 | 1 | 1 | 1 | 1 |
| 6200 | 0 | 0.8 | 0.8 | 1 | 1 | 1 | 1 | 1 | 1 |
| 6400 | 0 | 0.8 | 0.8 | 1 | 1 | 1 | 1 | 1 | 1 |
| 6600 | 0 | 0.8 | 0.8 | 1 | 1 | 1 | 1 | 1 | 1 |
| 6800 | 0 | 0.8 | 0.8 | 1 | 1 | 1 | 1 | 1 | 1 |
| 7000 | 0 | 0 | 0 | 1 | 1 | 1 | 1 | 1 | 1 |
| 7200 | 0 | 0 | 0 | 1 | 1 | 1 | 1 | 1 | 1 |
| 7400 | 0 | 0 | 0 | 1 | 1 | 1 | 1 | 1 | 1 |
| 7600 | 0 | 0 | 0 | 0.8 | 1 | 1 | 1 | 1 | 1 |
| 7800 | 0 | 0 | 0 | 0.8 | 1 | 1 | 1 | 1 | 1 |
| 8000 | 0 | 0 | 0 | 0.8 | 1 | 1 | 1 | 1 | 1 |
| 8200 | 0 | 0 | 0 | 0.8 | 1 | 1 | 1 | 1 | 1 |
| 8400 | 0 | 0 | 0 | 0.8 | 1 | 1 | 1 | 1 | 1 |

TABLE 3

| X-Axis<br>Y-Axis<br>Z-Axis | Throttle Valve Angle Percent<br>Engine Speed<br>Weighting Factor | | | | Weighting factor between control<br>methods by throttle valve angle | | | | | | |
|---|---|---|---|---|---|---|---|---|---|---|---|
| | 0 | 10 | 20 | 30 | 40 | 50 | 60 | 70 | 80 | 90 | 100 |
| 1000 | 0 | 0 | 0 | 0 | 0 | 0 | 0 | 0 | 0 | 0 | 0 |
| 2000 | 0 | 0 | 0 | 0 | 0 | 0 | 0 | 0 | 0 | 0 | 0 |
| 2500 | 0 | 0 | 0.8 | 0 | 0 | 0 | 0 | 0 | 0 | 0 | 0 |
| 3000 | 0 | 0 | 0.8 | 0.8 | 0.8 | 0.8 | 0.8 | 0.8 | 0.8 | 0.8 | 0.8 |
| 4000 | 0 | 0 | 0.8 | 1 | 1 | 1 | 1 | 1 | 1 | 1 | 1 |
| 4500 | 0 | 0 | 0.8 | 1 | 1 | 1 | 1 | 1 | 1 | 1 | 1 |
| 5000 | 0 | 0 | 0.8 | 1 | 1 | 1 | 1 | 1 | 1 | 1 | 1 |
| 5200 | 0 | 0 | 0.8 | 1 | 1 | 1 | 1 | 1 | 1 | 1 | 1 |
| 5400 | 0 | 0.8 | 0.8 | 1 | 1 | 1 | 1 | 1 | 1 | 1 | 1 |
| 5600 | 0 | 0.8 | 0.8 | 1 | 1 | 1 | 1 | 1 | 1 | 1 | 1 |

TABLE 3-continued

| X-Axis / Y-Axis / Z-Axis | Throttle Valve Angle Percent / Engine Speed / Weighting Factor | | | | Weighting factor between control methods by throttle valve angle | | | | | | |
|---|---|---|---|---|---|---|---|---|---|---|---|
| | 0 | 10 | 20 | 30 | 40 | 50 | 60 | 70 | 80 | 90 | 100 |
| 5800 | 0 | 0.8 | 0.8 | 1 | 1 | 1 | 1 | 1 | 1 | 1 | 1 |
| 6000 | 0 | 0.8 | 0.8 | 1 | 1 | 1 | 1 | 1 | 1 | 1 | 1 |
| 6200 | 0 | 0.8 | 0.8 | 1 | 1 | 1 | 1 | 1 | 1 | 1 | 1 |
| 6400 | 0 | 0.8 | 0.8 | 1 | 1 | 1 | 1 | 1 | 1 | 1 | 1 |
| 6600 | 0 | 0.8 | 0.8 | 1 | 1 | 1 | 1 | 1 | 1 | 1 | 1 |
| 6800 | 0 | 0.8 | 0.8 | 1 | 1 | 1 | 1 | 1 | 1 | 1 | 1 |
| 7000 | 0 | 0 | 0 | 1 | 1 | 1 | 1 | 1 | 1 | 1 | 1 |
| 7200 | 0 | 0 | 0 | 1 | 1 | 1 | 1 | 1 | 1 | 1 | 1 |
| 7400 | 0 | 0 | 0 | 1 | 1 | 1 | 1 | 1 | 1 | 1 | 1 |
| 7600 | 0 | 0 | 0 | 0.8 | 1 | 1 | 1 | 1 | 1 | 1 | 1 |
| 7800 | 0 | 0 | 0 | 0.8 | 1 | 1 | 1 | 1 | 1 | 1 | 1 |
| 8000 | 0 | 0 | 0 | 0.8 | 1 | 1 | 1 | 1 | 1 | 1 | 1 |
| 8200 | 0 | 0 | 0 | 0.8 | 1 | 1 | 1 | 1 | 1 | 1 | 1 |
| 8400 | 0 | 0 | 0 | 0.8 | 1 | 1 | 1 | 1 | 1 | 1 | 1 |

For set 201, engine speed 212 is utilized with barometric pressure 220 in order to calculate a base idle fuel amount 214 and then subsequently a fuel injection amount 218. For set 203, a crankcase pressure 216 is compared to engine speed 212 in order to calculate a base idle fuel amount 214 and then subsequently a fuel injection amount 218.

Figure 2B:
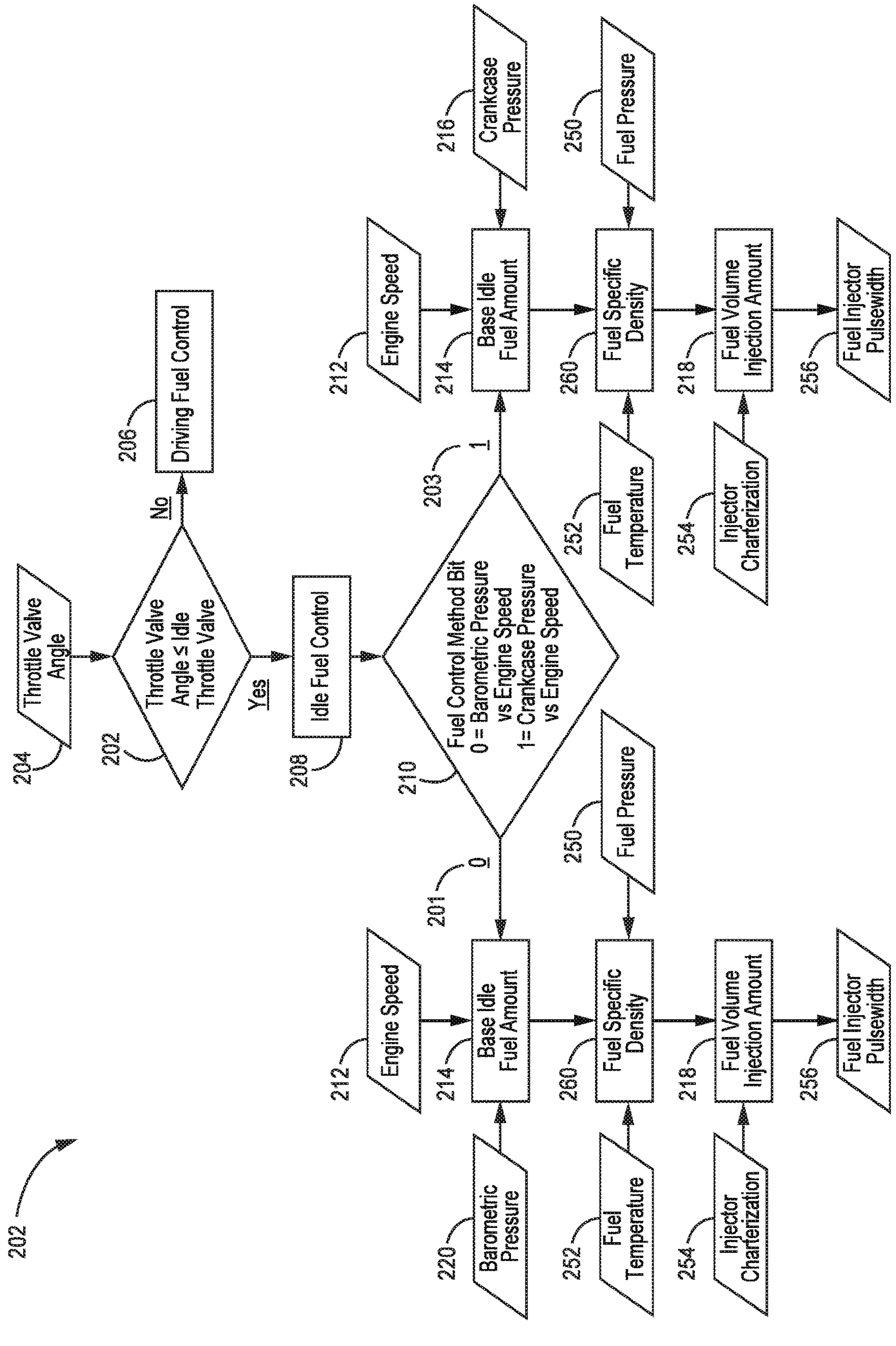
Figure 13:
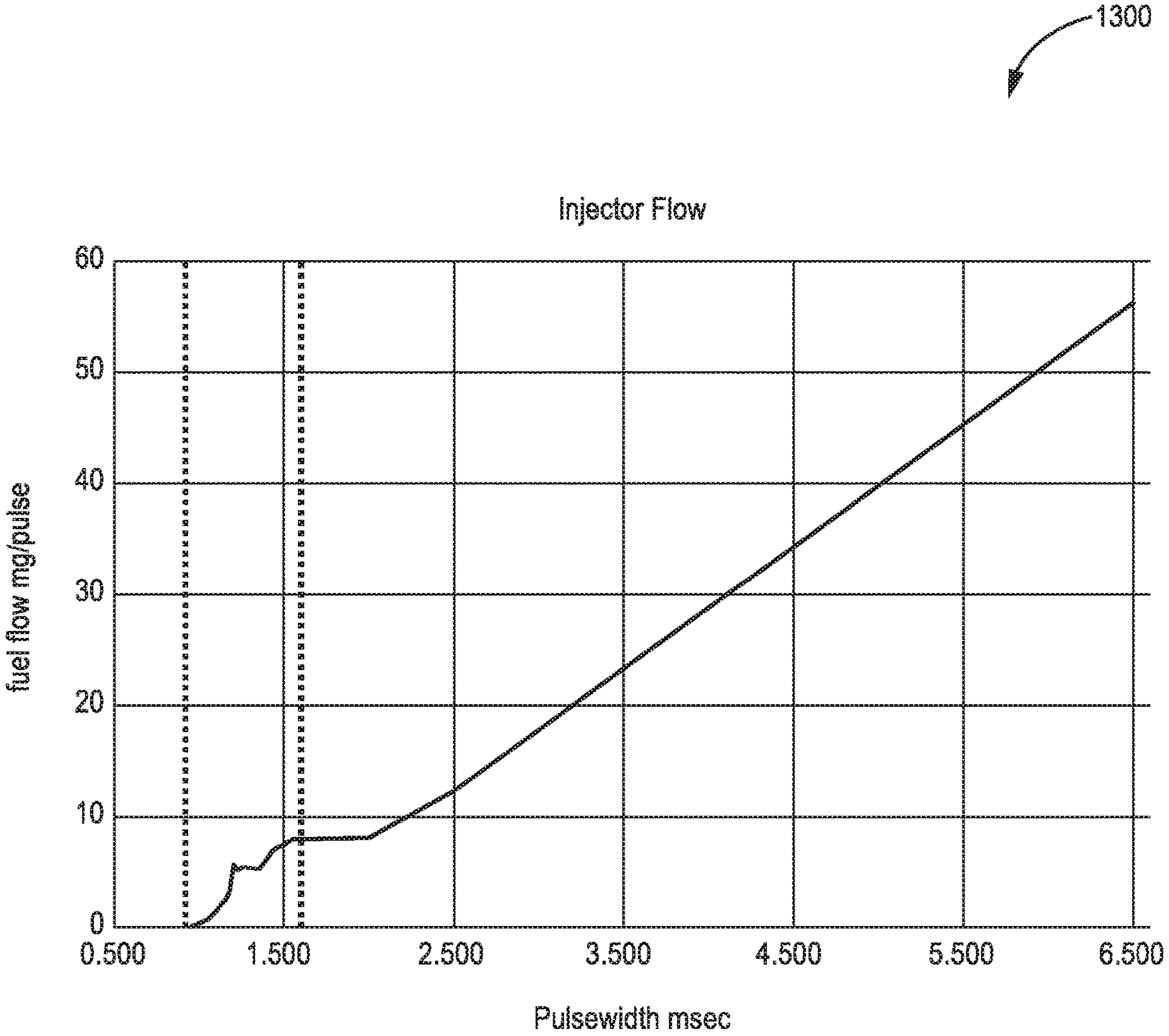
FIG. 13 illustrates a graph 1300 of an injector flow in a two-stroke internal combustion engine, according to some embodiments of this disclosure.

In the embodiment shown in FIG. 2B, further possible inputs and outputs related to fuel injection system are shown (see 202). After determining a base idle fuel amount 214, some combination of fuel temperature 252 and fuel pressure 250 is utilized to determine the fuel specific density 260 on a reference table. The fuel specific density 260 is then compared to the injector characterization 254 to calculate fuel injection volume amount 218 and then subsequently the fuel injector pulse width 256. Injector characterization 254 refers to pre-modeling or pre-testing of an injector system. The ratio of fuel to oil can be more precisely controlled in this method, for example. The purpose of fuel pressure control is to broaden the effective fuel flow range of a fuel injector. In a load situation, when a fuel injector is operated below 1.6 msec the injector flowrate versus injector pulse width is nonlinear (see 1300 of FIG. 13). This makes modeling fuel injector operation difficult. By decreasing the fuel pressure, the fuel flow is decreased. In order to match the desired fuel flowrate, the fuel pulse width is increased potentially into a linear region where the fuel injector performance can be more easily modeled. Conversely, in a high load situation where a fuel injector is operated near maximum duty, when the fuel pressure is increased, the fuel flow is increased. To match the desired fuel flowrate the injector pulse width is decreased, reducing the injector duty allowing for long fuel atomization time. Therefore, in this embodiment fuel pressure is actively controlled (versus simply monitoring).

Figure 3A:
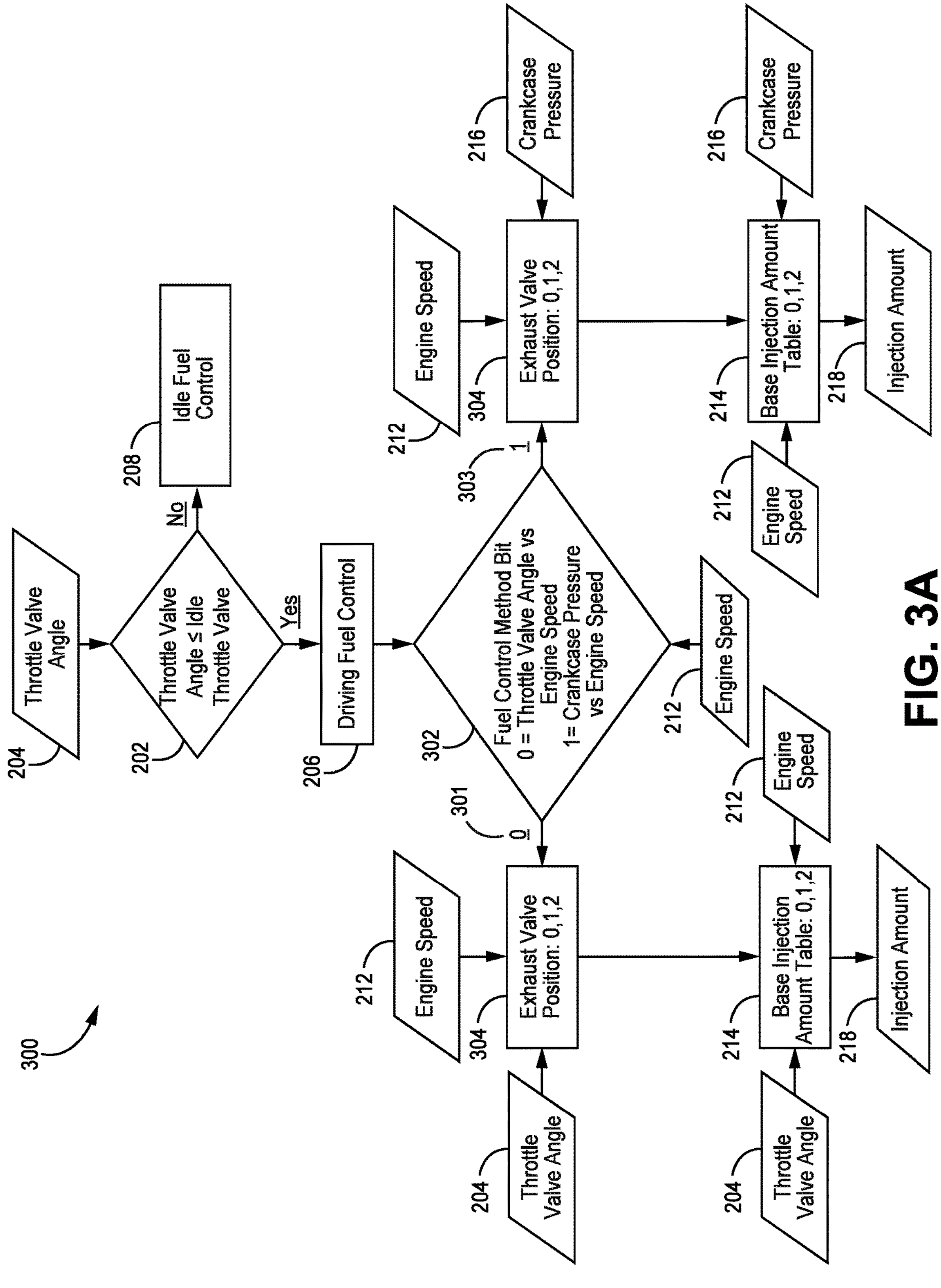
FIGS. 3A-B illustrate flow chart diagrams 300, 302 of a method of controlling a two-stroke internal combustion engine, according to some embodiments of this disclosure.

Referring to FIG. 3A, a flow chart diagram 300 of a method of controlling a two-stroke internal combustion engine is shown, according to some embodiments of this disclosure. An initial input value, such as throttle valve angle 204 can be measured. The initial input is compared 302 by the ECU to a reference position. Engine speed 212 can also be used as an initial input in this example, before the ECU selects set 301 or set 303. In this example, current throttle valve angle or position 204 is compared to the reference throttle valve angle to determine if the engine is in drive mode or idle mode. If in drive mode, the ECU follows the analysis of the driving fuel control module 206. If in idle mode, the ECU follows the analysis of the idle fuel control module 208. In this embodiment, the ECU selects between one of two sets 301, 303 of engine parameter inputs in drive mode.

Figure 3B:
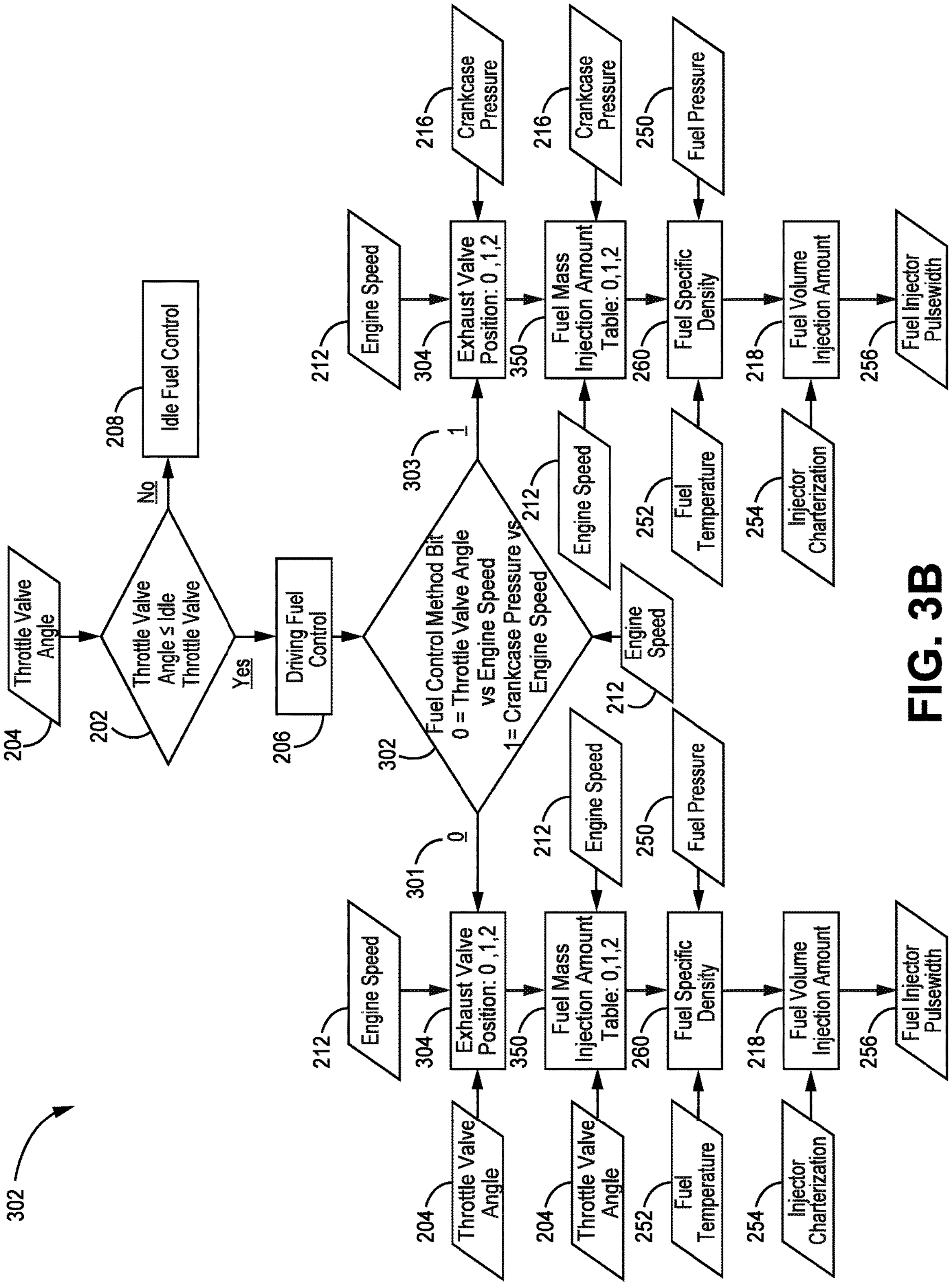
Figure 4A:
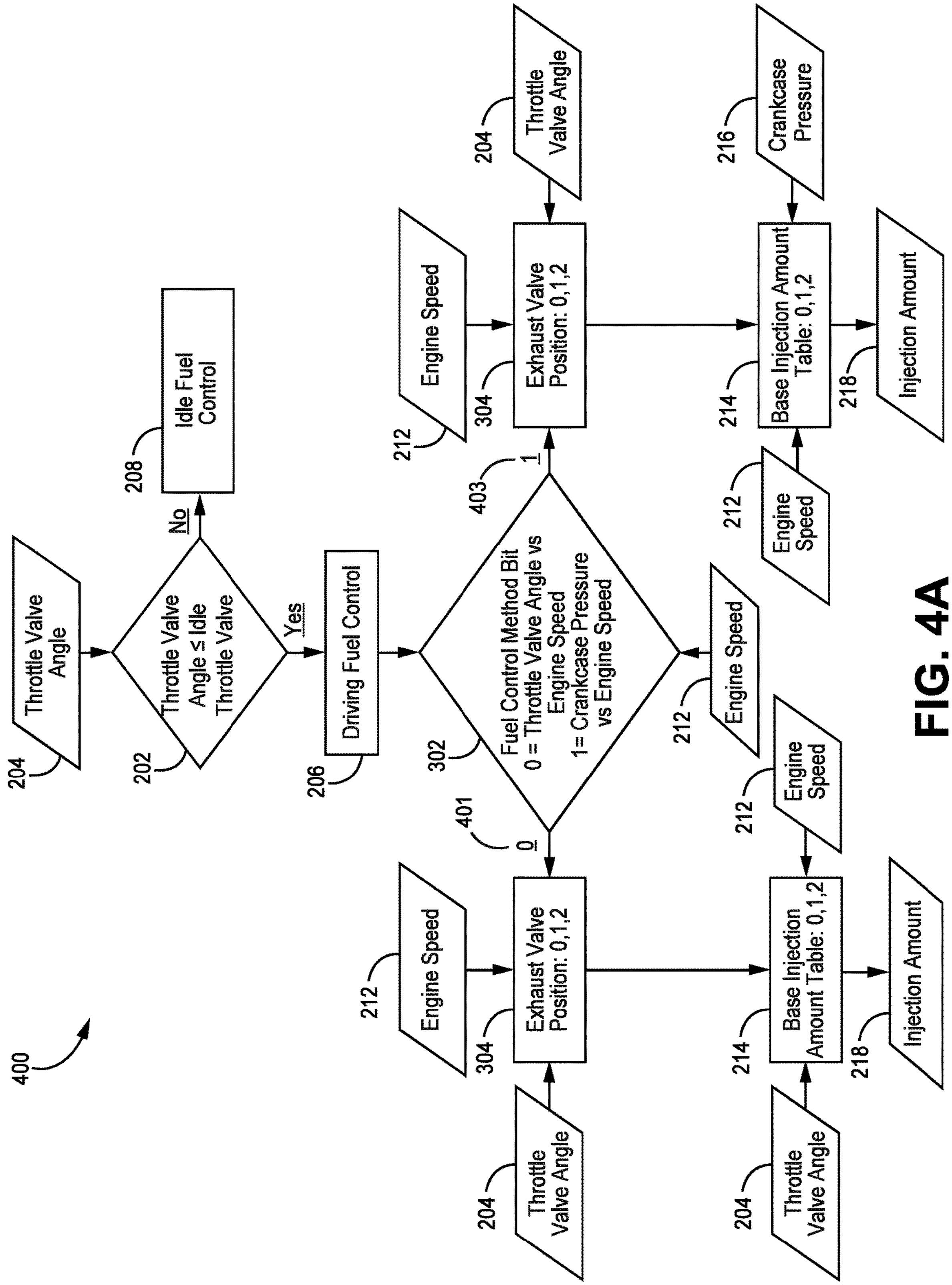
FIGS. 4A-B illustrate flow chart diagrams 400, 402 of a method of controlling a two-stroke internal combustion engine, according to some embodiments of this disclosure.

Set 301 utilizes engine speed 212 with throttle valve angle 204 to determine an exhaust valve position 304. The exhaust valve position 304 is then used an as input in consideration with throttle valve angle 204 and engine speed 212 to determine fuel injection amount 218. For set 303, crankcase pressure 216 measurement is substituted for throttle valve angle 204 only after the exhaust valve positioning in 304, within the engine parameter inputs. In FIG. 3B, view 302 additionally utilizes throttle valve angle 204 and engine speed 212 to calculate fuel mass injection amount 350. This can then be utilized to find the fuel specific density 260 with fuel temperature 252 and fuel pressure 250 as inputs. Using injector characterization 254, a fuel volume injection amount 218 and fuel injector pulse width 256 are calculated. Another embodiment in drive mode is illustrated in FIG. 4A (see view 400). Both sets 401, 403 utilize engine speed 212 and throttle angle 204 to determine exhaust valve position 304. To finalize the injection amount measurement 214, set 401 utilizes engine speed 212, throttle valve angle 204, and exhaust valve position to output the fuel injection amount 218. Set 403 differs in that crankcase pressure 216 is utilized with engine speed 212 and exhaust valve position 304 to determine fuel amount 214 and final injection amount output 218. An example injection fuel amount 218 table is shown in Table 4 below.

| X-Axis / Y-Axis / Z-Axis | RPM / Crankcase Pressure / Amount of fuel | | | | | | | | | | |
|---|---|---|---|---|---|---|---|---|---|---|---|
| | 300 | 400 | 500 | 600 | 700 | 800 | 900 | 1000 | 1100 | 1200 | 1400 |
| 1000 | 2 | 4 | 6 | 8 | 10 | 12 | 14 | 16 | 18 | 20 | 22 |
| 2000 | 4 | 6 | 8 | 10 | 12 | 14 | 16 | 18 | 20 | 22 | 24 |
| 2500 | 6 | 8 | 10 | 12 | 14 | 16 | 18 | 20 | 22 | 24 | 26 |
| 3000 | 8 | 10 | 12 | 14 | 16 | 18 | 20 | 22 | 24 | 26 | 28 |
| 4000 | 10 | 12 | 14 | 16 | 18 | 20 | 22 | 24 | 26 | 28 | 30 |
| 4500 | 12 | 14 | 16 | 18 | 20 | 22 | 24 | 26 | 28 | 30 | 32 |
| 5000 | 14 | 16 | 18 | 20 | 22 | 24 | 26 | 28 | 30 | 32 | 34 |
| 5200 | 16 | 18 | 20 | 22 | 24 | 26 | 28 | 30 | 32 | 34 | 36 |
| 5400 | 18 | 20 | 22 | 24 | 26 | 28 | 30 | 32 | 34 | 36 | 38 |
| 5600 | 20 | 22 | 24 | 26 | 28 | 30 | 32 | 34 | 36 | 38 | 40 |
| 5800 | 22 | 24 | 26 | 28 | 30 | 32 | 34 | 36 | 38 | 40 | 42 |
| 6000 | 24 | 26 | 28 | 30 | 32 | 34 | 36 | 38 | 40 | 42 | 44 |

-continued

| X-Axis<br>Y-Axis<br>Z-Axis | RPM<br>Crankcase Pressure<br>Amount of fuel | | | | | | | | | | |
|---|---|---|---|---|---|---|---|---|---|---|---|
| | 300 | 400 | 500 | 600 | 700 | 800 | 900 | 1000 | 1100 | 1200 | 1400 |
| 6200 | 26 | 28 | 30 | 32 | 34 | 36 | 38 | 40 | 42 | 44 | 46 |
| 6400 | 28 | 30 | 32 | 34 | 36 | 38 | 40 | 42 | 44 | 46 | 48 |
| 6600 | 30 | 32 | 34 | 36 | 38 | 40 | 42 | 44 | 46 | 48 | 50 |
| 6800 | 32 | 34 | 36 | 38 | 40 | 42 | 44 | 46 | 48 | 50 | 52 |
| 7000 | 34 | 36 | 38 | 40 | 42 | 44 | 46 | 48 | 50 | 52 | 54 |
| 7200 | 36 | 38 | 40 | 42 | 44 | 46 | 48 | 50 | 52 | 54 | 56 |
| 7400 | 38 | 40 | 42 | 44 | 46 | 48 | 50 | 52 | 54 | 56 | 58 |
| 7600 | 40 | 42 | 44 | 46 | 48 | 50 | 52 | 54 | 56 | 58 | 60 |
| 7800 | 42 | 44 | 46 | 48 | 50 | 52 | 54 | 56 | 58 | 60 | 62 |
| 8000 | 44 | 46 | 48 | 50 | 52 | 54 | 56 | 58 | 60 | 62 | 64 |
| 8200 | 46 | 48 | 50 | 52 | 54 | 56 | 58 | 60 | 62 | 64 | 66 |
| 8400 | 30 | 34 | 38 | 42 | 46 | 50 | 54 | 58 | 62 | 66 | 70 |

Figure 4B:
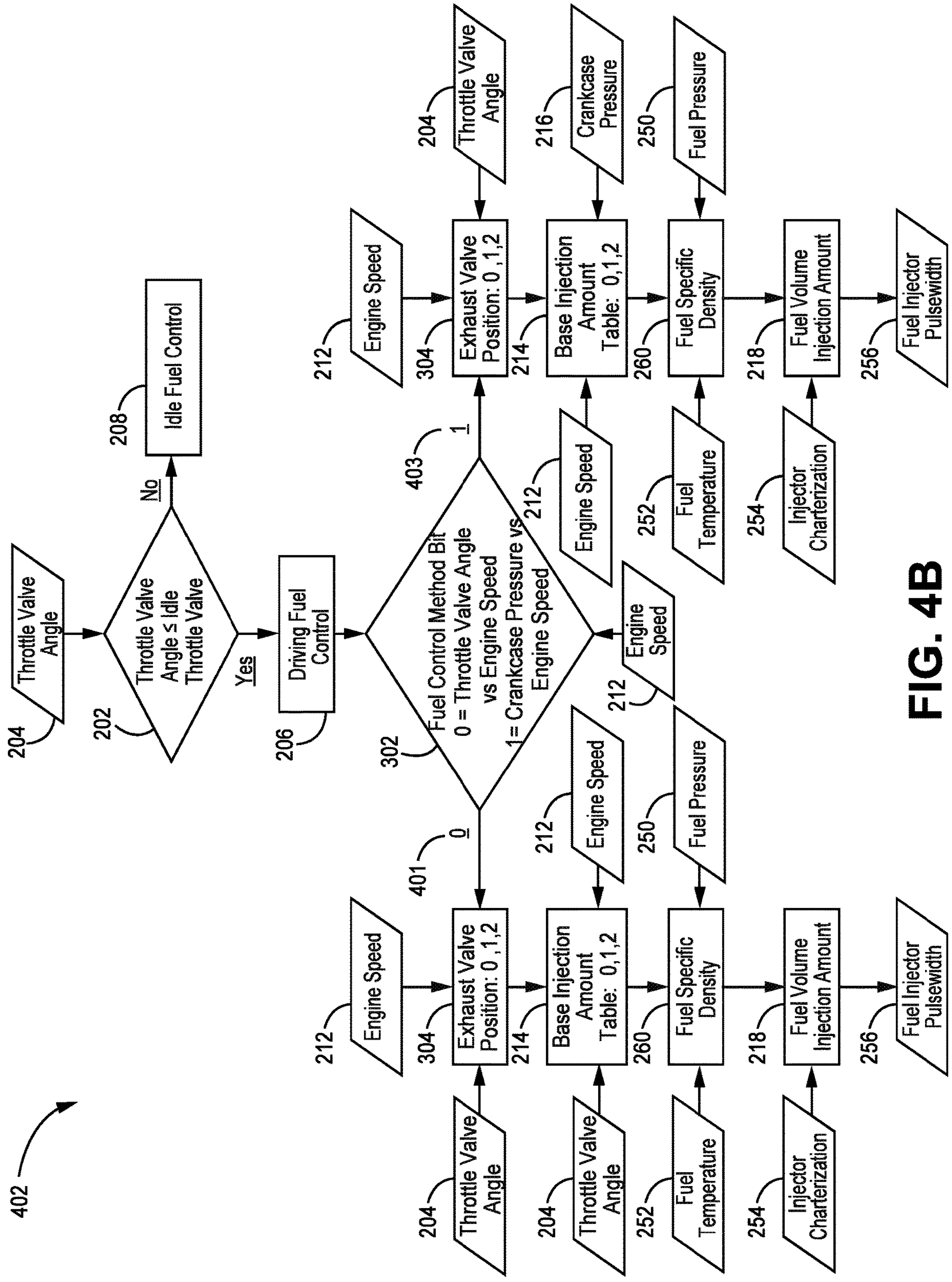

FIG. 4B (view 402) includes a further calculation of fuel specific density 260, from fuel temperature 252 and fuel pressure 250. The fuel volume injection amount 218 can then be calculated using injector characterization 254 and then ultimately, a fuel injector pulse width 256 determined.

Figure 5A:
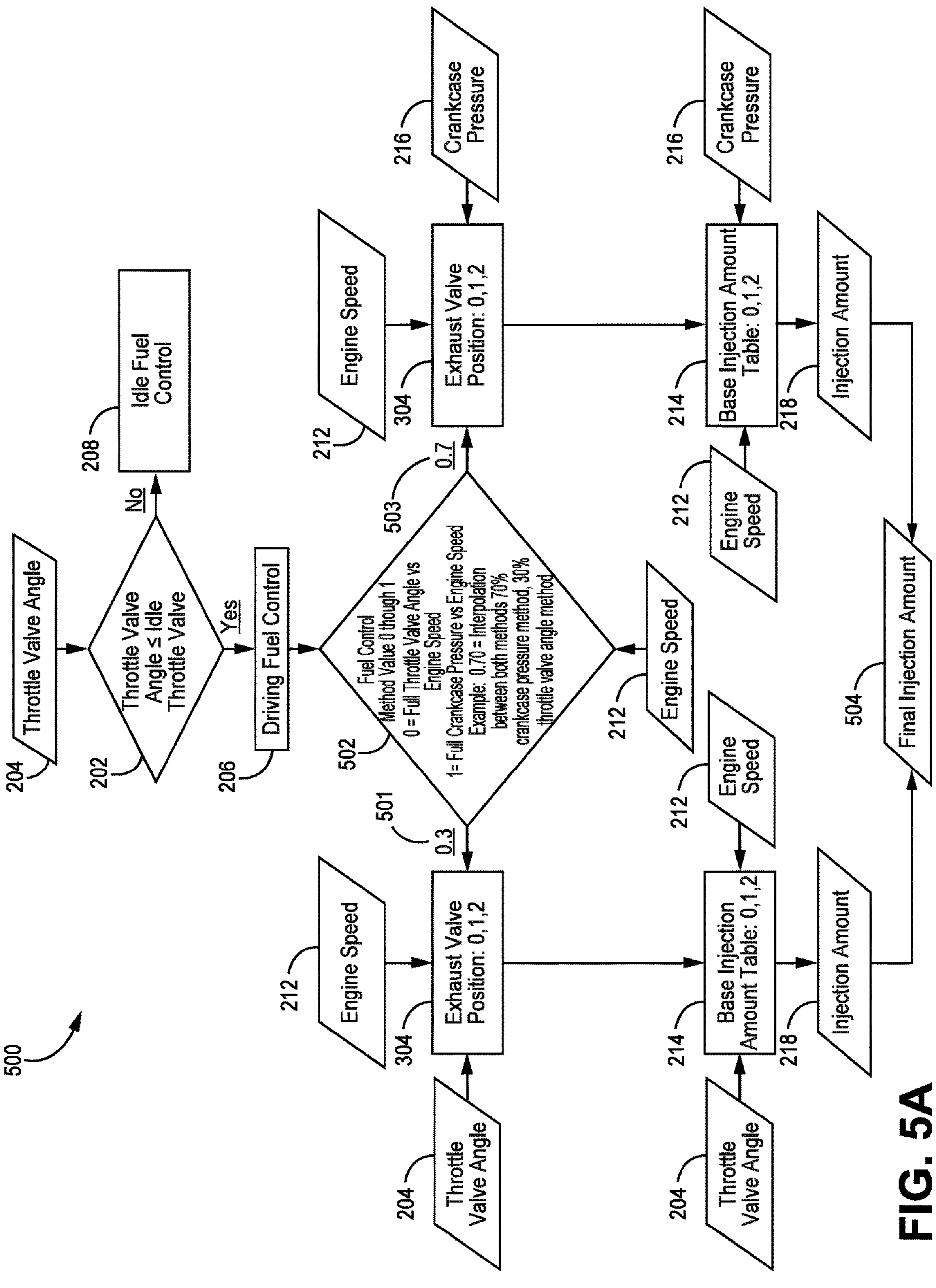
FIGS. 5A-B illustrate flow chart diagrams 500, 502 of a method of controlling a two-stroke internal combustion engine, according to some embodiments of this disclosure.
Figure 5B:
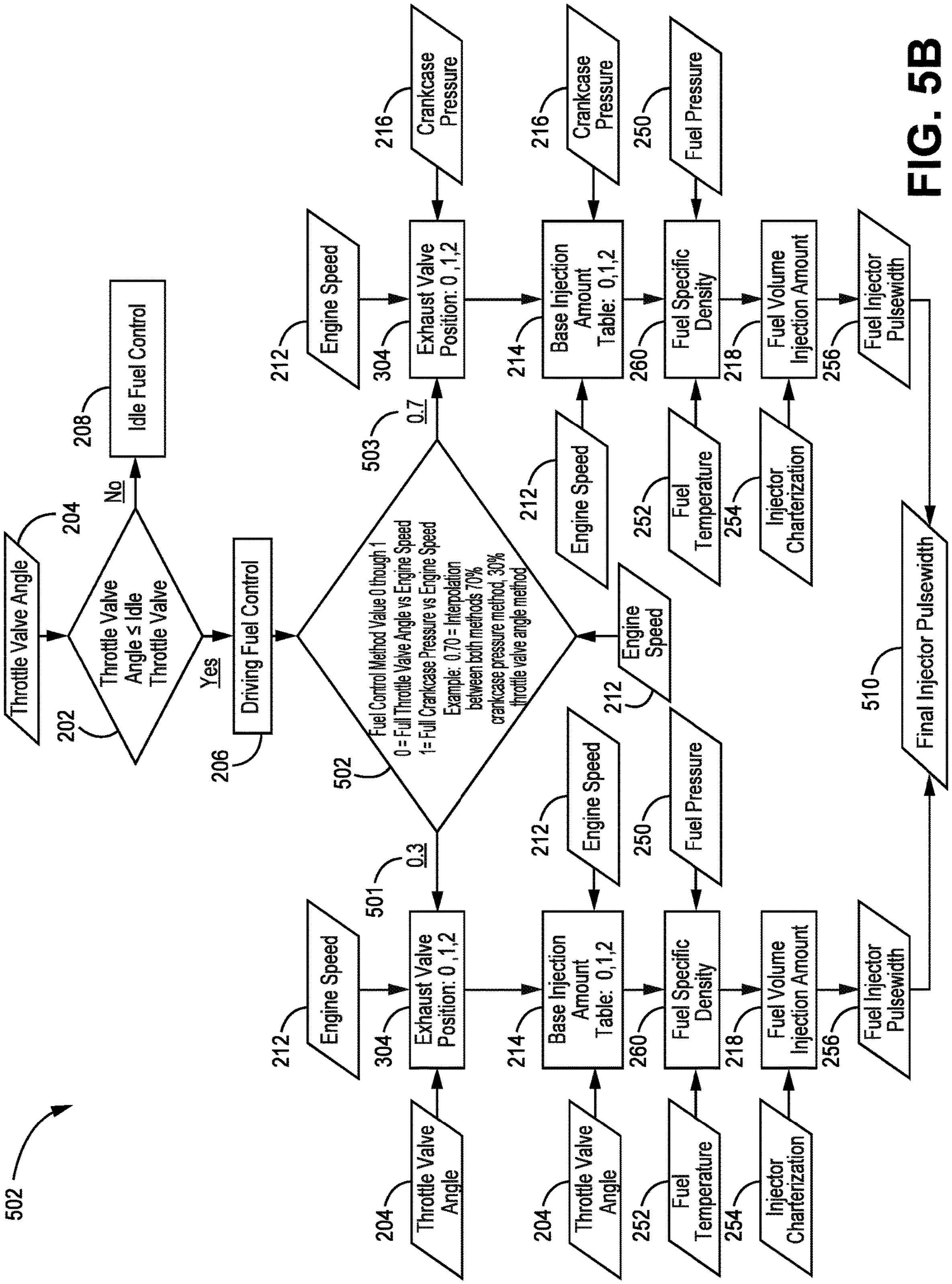

Referring to FIG. 5A, a flow chart diagram 500 of a method of controlling a two-stroke internal combustion engine is shown, according to some embodiments of this disclosure. Sets 501, 503 are similar to previously discussed drive mode sets in FIG. 3. In this embodiment, the decision 502 on which set to choose is a weighted combination of the two sets 501, 503. The example shows a 0.3 weight given to set 501, and a 0.7 weight value given to set 503. The final fuel injection amount 504 reflects the weighted consideration of the injection amount calculated 218 in each set. The weighting may be any increments between 0.01 and 0.99 for one set and 0.99 and 0.01 for the other set, for example. If more than two sets of engine parameter inputs are utilized, the weighting may include any distribution of values between 0 and 1 across the plurality of sets, such that the total of the weights equal 1. FIG. 5B (view 502) includes a further calculation of fuel specific density 260, from fuel temperature 252 and fuel pressure 250. The fuel volume injection amount 218 can then be calculated using injector characterization 254 and then ultimately, a fuel injector pulse width 256 determined. The combined pulse width 510 can also be determined using a weighted combination of methods.

Figure 6:
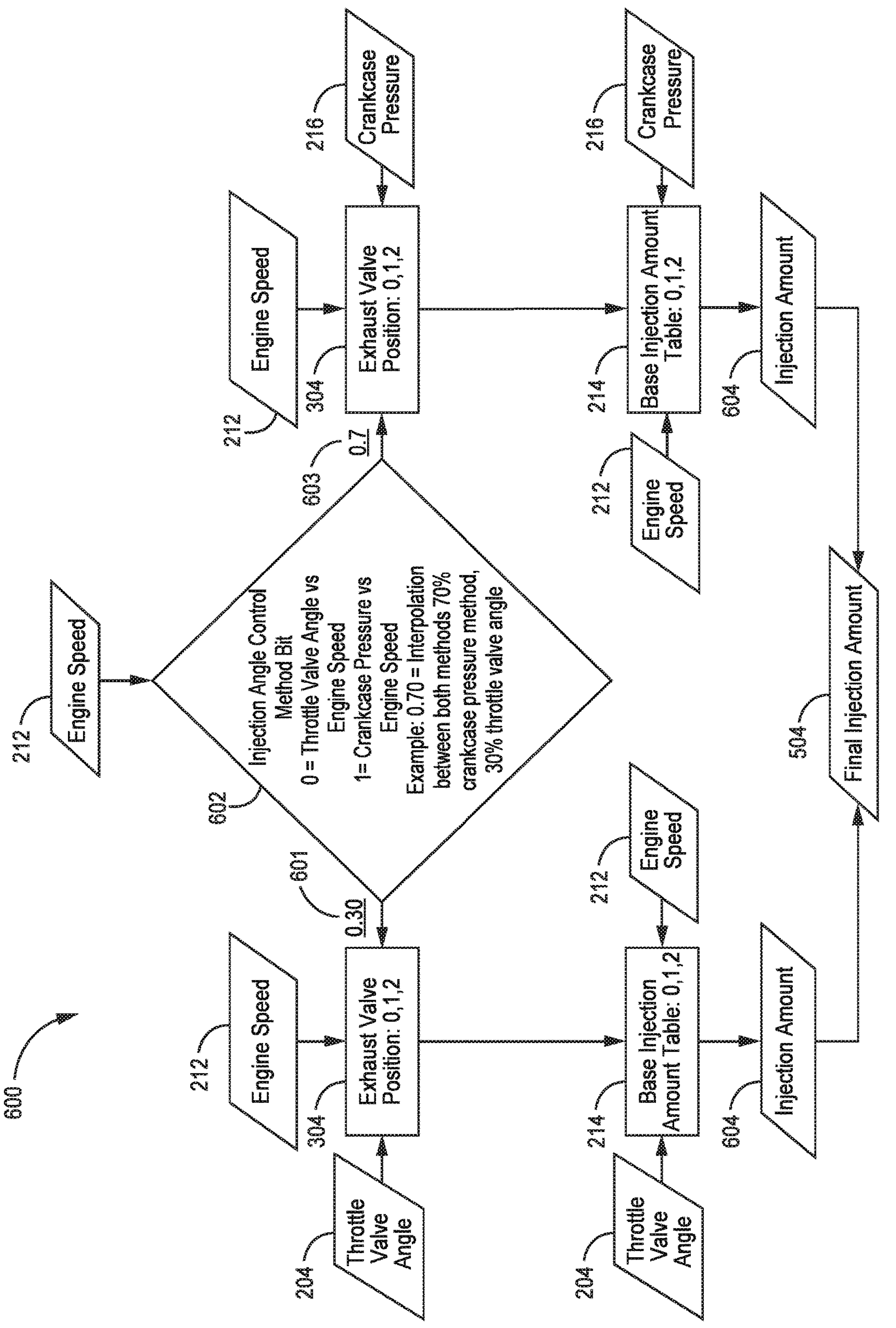
FIG. 6 illustrates a flow chart diagram 600 of a method of controlling a two-stroke internal combustion engine, according to some embodiments of this disclosure.
Figure 7:
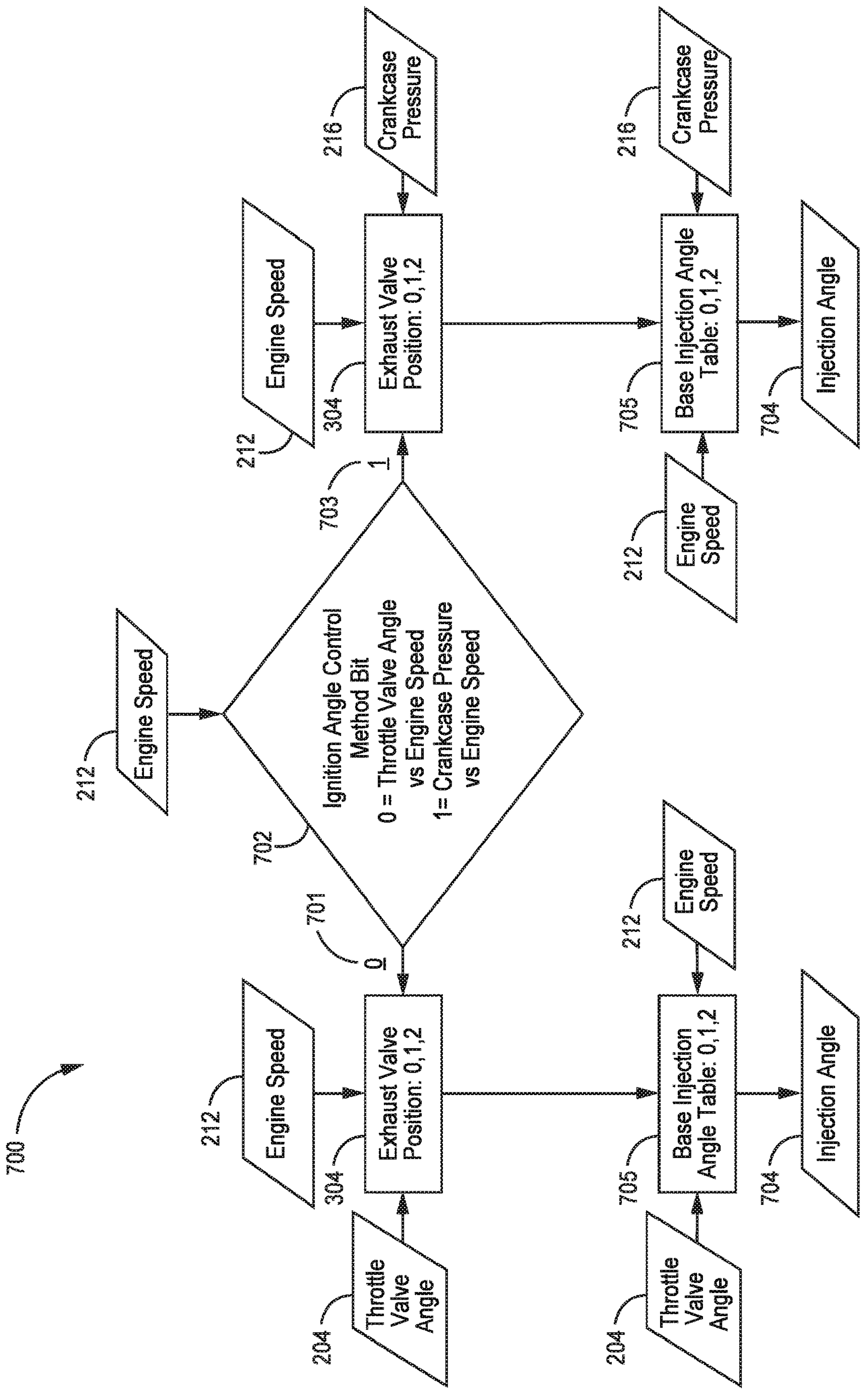
FIG. 7 illustrates a flow chart diagram 700 of a method of controlling a two-stroke internal combustion engine, according to some embodiments of this disclosure.
Figure 8:
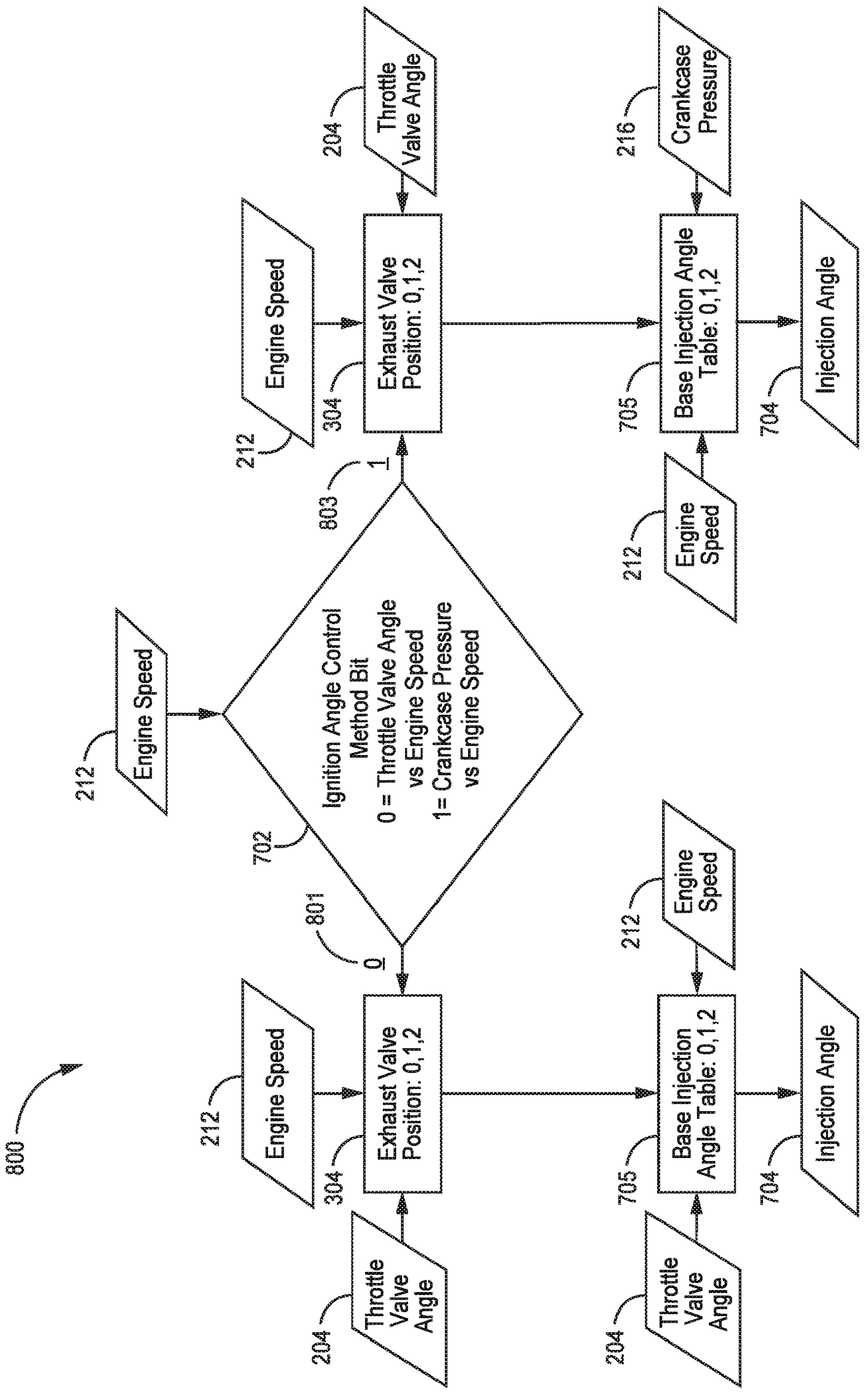
FIG. 8 illustrates a flow chart diagram 800 of a method of controlling a two-stroke internal combustion engine, according to some embodiments of this disclosure.
Figure 9:
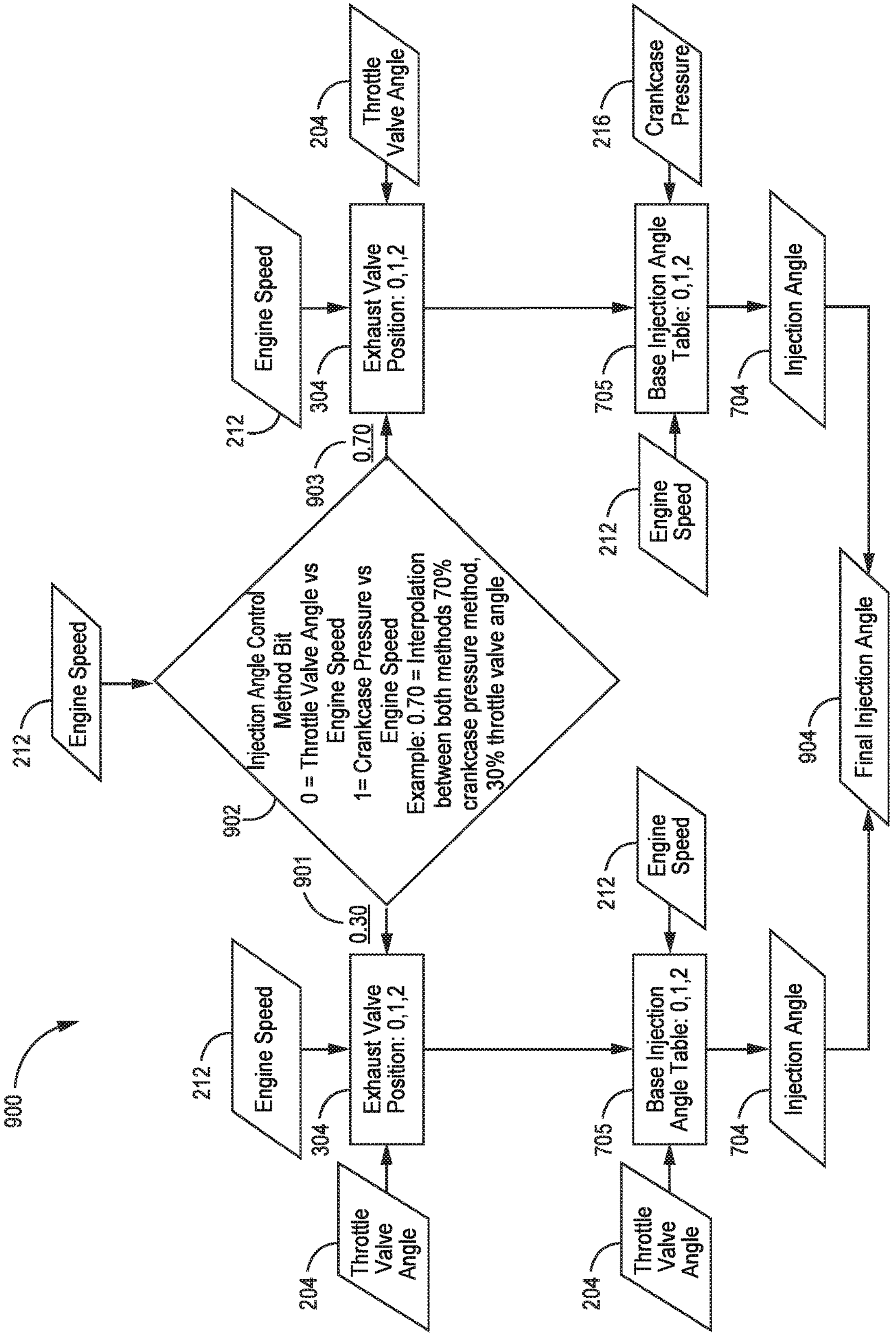
FIG. 9 illustrates a flow chart diagram 900 of a method of controlling a two-stroke internal combustion engine, according to some embodiments of this disclosure.

Referring to FIG. 6, a flow chart diagram 600 of a method of controlling a two-stroke internal combustion engine is shown, according to some embodiments of this disclosure. In this embodiment, a final fuel injection angle 606 is calculated as the engine output parameter from a weighted analysis of sets 601, 603 of engine parameter inputs. Engine speed 212 is measured and inputted for analysis 602 by the ECU. Either one of sets 601,603 may be selected, but in this example, a weighted consideration is utilized. Set 601 utilizes engine speed 212 and throttle valve angle 204 to determine an exhaust valve position 304, which is then used as an input with engine speed 212 and throttle valve position 204 to determine fuel injection angle 604. For set 603, a crankcase pressure measurement 216 is substituted for the throttle valve angle input 204. The injection angle outputs 604 from each set are used to determine a final injection angle 606. In FIG. 7 (see view 700), similar measurements are used for sets 701, 703, but with the goal of ignition angle 705 table being referenced to produce final ignition angle 704 as the engine output parameter. The analysis or control unit 702 selects between sets 701,703. In FIG. 8 (see view 800), ignition angle 704 is the engine output parameter, but sets 801,803 differ from sets 701,703 in that crankcase pressure 216 is only measured once in set 803 as an input for the ignition angle 705 and final ignition angle output 704. FIG. 9 (see view 900), shows a similar approach to FIG. 8, in which sets 901,903 output ignition angle 704. In this example, analysis 902 uses weighting between sets 901,903 to calculate a final ignition angle 904.

Additional examples of lookup or reference tables that can be used for engine control calculations include Table 5 in which fuel pressure can be controlled based on crankcase pressure. Table 6 shows fuel pressure control based on barometric pressure. Table 7 shows an example of ignition timing based on crankcase pressure. Table 8 displays the start of injection angle versus crankcase pressure.

TABLE 5

| X-Axis<br>Y-Axis<br>Z-Axis | Crankcase pressure (mmHg)<br>Engine Speed<br>Target Fuel Pressure | | | | Fuel Pressure control based<br>on crankcase pressure | | | |
|---|---|---|---|---|---|---|---|---|
| | 300 | 400 | 500 | 600 | 700 | 800 | 1000 | 1200 |
| 1000 | 400 | 400 | 400 | 400 | 450 | 450 | 450 | 450 |
| 2000 | 400 | 400 | 400 | 400 | 450 | 450 | 450 | 450 |
| 3000 | 400 | 400 | 400 | 400 | 450 | 450 | 450 | 450 |
| 4000 | 400 | 400 | 400 | 400 | 450 | 450 | 450 | 450 |
| 5000 | 400 | 400 | 400 | 400 | 500 | 500 | 500 | 500 |
| 6000 | 400 | 400 | 400 | 400 | 500 | 500 | 500 | 500 |
| 7000 | 400 | 400 | 400 | 400 | 500 | 500 | 500 | 500 |
| 8000 | 400 | 400 | 400 | 400 | 500 | 500 | 500 | 500 |
| 9000 | 400 | 400 | 400 | 400 | 500 | 500 | 500 | 500 |

TABLE 6

| X-Axis<br>Y-Axis<br>Z-Axis | Barometric Pressure (mmHg)<br>Engine Speed<br>Target Fuel Pressure | | | | Fuel Pressure control based<br>on barometric pressure | | | |
|---|---|---|---|---|---|---|---|---|
| | 300 | 400 | 500 | 600 | 700 | 700 | 800 | 900 |
| 1000 | 400 | 400 | 400 | 400 | 450 | 450 | 450 | 450 |
| 2000 | 400 | 400 | 400 | 400 | 450 | 450 | 450 | 450 |
| 3000 | 400 | 400 | 400 | 400 | 450 | 450 | 450 | 450 |
| 4000 | 400 | 400 | 400 | 400 | 450 | 450 | 450 | 450 |
| 5000 | 400 | 400 | 400 | 400 | 500 | 500 | 500 | 500 |
| 6000 | 400 | 400 | 400 | 400 | 500 | 500 | 500 | 500 |
| 7000 | 400 | 400 | 400 | 400 | 500 | 500 | 500 | 500 |
| 8000 | 400 | 400 | 400 | 400 | 500 | 500 | 500 | 500 |
| 9000 | 400 | 400 | 400 | 400 | 500 | 500 | 500 | 500 |

TABLE 7

| X-Axis<br>Y-Axis<br>Z-Axis | Crankcase Pressure (mmHg)<br>Engine Speed<br>Ignition timing | | | | Ignition timing based on<br>crankcase pressure | | | | | | |
|---|---|---|---|---|---|---|---|---|---|---|---|
| | 300 | 400 | 500 | 600 | 700 | 800 | 900 | 1000 | 1100 | 1200 | 1400 |
| 1000 | 25 | 25 | 25 | 25 | 25 | 25 | 25 | 25 | 25 | 25 | 25 |

TABLE 7-continued

| X-Axis<br>Y-Axis<br>Z-Axis | Crankcase Pressure (mmHg)<br>Engine Speed<br>Ignition timing | | | | Ignition timing based on crankcase pressure | | | | | | |
|---|---|---|---|---|---|---|---|---|---|---|---|
| | 300 | 400 | 500 | 600 | 700 | 800 | 900 | 1000 | 1100 | 1200 | 1400 |
| 2000 | 25 | 25 | 25 | 25 | 25 | 25 | 25 | 25 | 25 | 25 | 25 |
| 2500 | 25 | 25 | 25 | 25 | 25 | 25 | 25 | 25 | 25 | 25 | 25 |
| 3000 | 25 | 25 | 25 | 25 | 25 | 25 | 25 | 25 | 25 | 25 | 25 |
| 4000 | 25 | 25 | 25 | 25 | 25 | 25 | 25 | 25 | 25 | 25 | 25 |
| 4500 | 25 | 25 | 25 | 25 | 25 | 25 | 25 | 25 | 25 | 25 | 25 |
| 5000 | 25 | 25 | 25 | 25 | 25 | 25 | 25 | 25 | 25 | 25 | 25 |
| 5200 | 25 | 25 | 25 | 25 | 25 | 25 | 25 | 25 | 25 | 25 | 25 |
| 5400 | 25 | 25 | 25 | 25 | 25 | 25 | 25 | 25 | 25 | 25 | 25 |
| 5600 | 22 | 22 | 22 | 22 | 22 | 24 | 24 | 24 | 22 | 22 | 22 |
| 5800 | 20 | 20 | 20 | 20 | 20 | 22 | 22 | 22 | 20 | 20 | 20 |
| 6000 | 20 | 20 | 20 | 20 | 20 | 22 | 22 | 22 | 20 | 20 | 20 |
| 6200 | 18 | 18 | 18 | 18 | 18 | 20 | 20 | 20 | 18 | 18 | 18 |
| 6400 | 18 | 18 | 18 | 18 | 18 | 20 | 20 | 20 | 18 | 18 | 18 |
| 6600 | 18 | 18 | 18 | 18 | 18 | 20 | 20 | 20 | 18 | 18 | 18 |
| 6800 | 16 | 16 | 16 | 16 | 16 | 17 | 17 | 17 | 16 | 16 | 16 |
| 7000 | 16 | 16 | 16 | 16 | 16 | 17 | 17 | 17 | 16 | 16 | 16 |
| 7200 | 15 | 15 | 15 | 15 | 15 | 16 | 16 | 16 | 15 | 15 | 15 |
| 7400 | 14 | 14 | 14 | 14 | 14 | 15 | 15 | 15 | 14 | 14 | 14 |
| 7600 | 14 | 14 | 14 | 14 | 14 | 15 | 15 | 15 | 14 | 14 | 14 |
| 7800 | 14 | 14 | 14 | 14 | 14 | 15 | 15 | 15 | 14 | 14 | 14 |
| 8000 | 13 | 13 | 13 | 13 | 13 | 14 | 14 | 14 | 13 | 13 | 13 |
| 8200 | 12 | 12 | 12 | 12 | 12 | 13 | 13 | 13 | 12 | 12 | 12 |
| 8400 | 12 | 12 | 12 | 12 | 12 | 13 | 13 | 13 | 12 | 12 | 12 |

TABLE 8

| X-Axis<br>Y-Axis<br>Z-Axis | Crankcase Pressure (mmHg)<br>Engine Speed<br>Injection Angle | | | Start Injection Angle based on crankcase | | | | | | | |
|---|---|---|---|---|---|---|---|---|---|---|---|
| | 300 | 400 | 500 | 600 | 700 | 800 | 900 | 1000 | 1100 | 1200 | 1400 |
| 1000 | 250 | 250 | 250 | 250 | 250 | 250 | 250 | 250 | 250 | 250 | 250 |
| 2000 | 250 | 250 | 250 | 250 | 250 | 250 | 250 | 250 | 250 | 250 | 250 |
| 2500 | 250 | 250 | 250 | 250 | 250 | 250 | 250 | 250 | 250 | 250 | 250 |
| 3000 | 250 | 250 | 250 | 250 | 250 | 250 | 250 | 250 | 250 | 250 | 250 |
| 4000 | 250 | 250 | 250 | 250 | 250 | 250 | 250 | 300 | 300 | 300 | 300 |
| 4500 | 250 | 250 | 250 | 250 | 250 | 250 | 250 | 300 | 300 | 300 | 300 |
| 5000 | 250 | 250 | 250 | 250 | 250 | 250 | 250 | 300 | 300 | 300 | 300 |
| 5200 | 250 | 250 | 250 | 250 | 250 | 250 | 330 | 330 | 330 | 330 | 330 |
| 5400 | 250 | 250 | 250 | 250 | 250 | 250 | 330 | 330 | 330 | 330 | 330 |
| 5600 | 250 | 250 | 250 | 250 | 250 | 250 | 330 | 330 | 330 | 330 | 330 |
| 5800 | 250 | 250 | 250 | 250 | 250 | 250 | 330 | 330 | 330 | 330 | 330 |
| 6000 | 250 | 250 | 250 | 250 | 250 | 250 | 330 | 330 | 330 | 330 | 330 |
| 6200 | 250 | 250 | 250 | 330 | 330 | 330 | 360 | 360 | 360 | 360 | 360 |
| 6400 | 250 | 250 | 250 | 330 | 330 | 330 | 360 | 360 | 360 | 360 | 360 |
| 6600 | 250 | 250 | 250 | 330 | 330 | 330 | 400 | 400 | 400 | 400 | 400 |
| 6800 | 250 | 250 | 250 | 330 | 330 | 330 | 400 | 400 | 400 | 400 | 400 |
| 7000 | 250 | 250 | 250 | 330 | 330 | 330 | 400 | 400 | 400 | 400 | 400 |
| 7200 | 250 | 250 | 250 | 330 | 330 | 330 | 400 | 400 | 400 | 400 | 400 |
| 7400 | 250 | 250 | 250 | 330 | 330 | 330 | 400 | 400 | 400 | 400 | 400 |
| 7600 | 250 | 250 | 250 | 330 | 330 | 330 | 400 | 400 | 400 | 400 | 400 |
| 7800 | 250 | 250 | 250 | 330 | 330 | 330 | 400 | 400 | 400 | 400 | 400 |
| 8000 | 250 | 250 | 250 | 330 | 330 | 330 | 400 | 400 | 400 | 400 | 400 |
| 8200 | 250 | 250 | 250 | 330 | 330 | 330 | 400 | 400 | 400 | 400 | 400 |
| 8400 | 250 | 250 | 250 | 330 | 330 | 330 | 400 | 400 | 400 | 400 | 400 |

Figure 11:
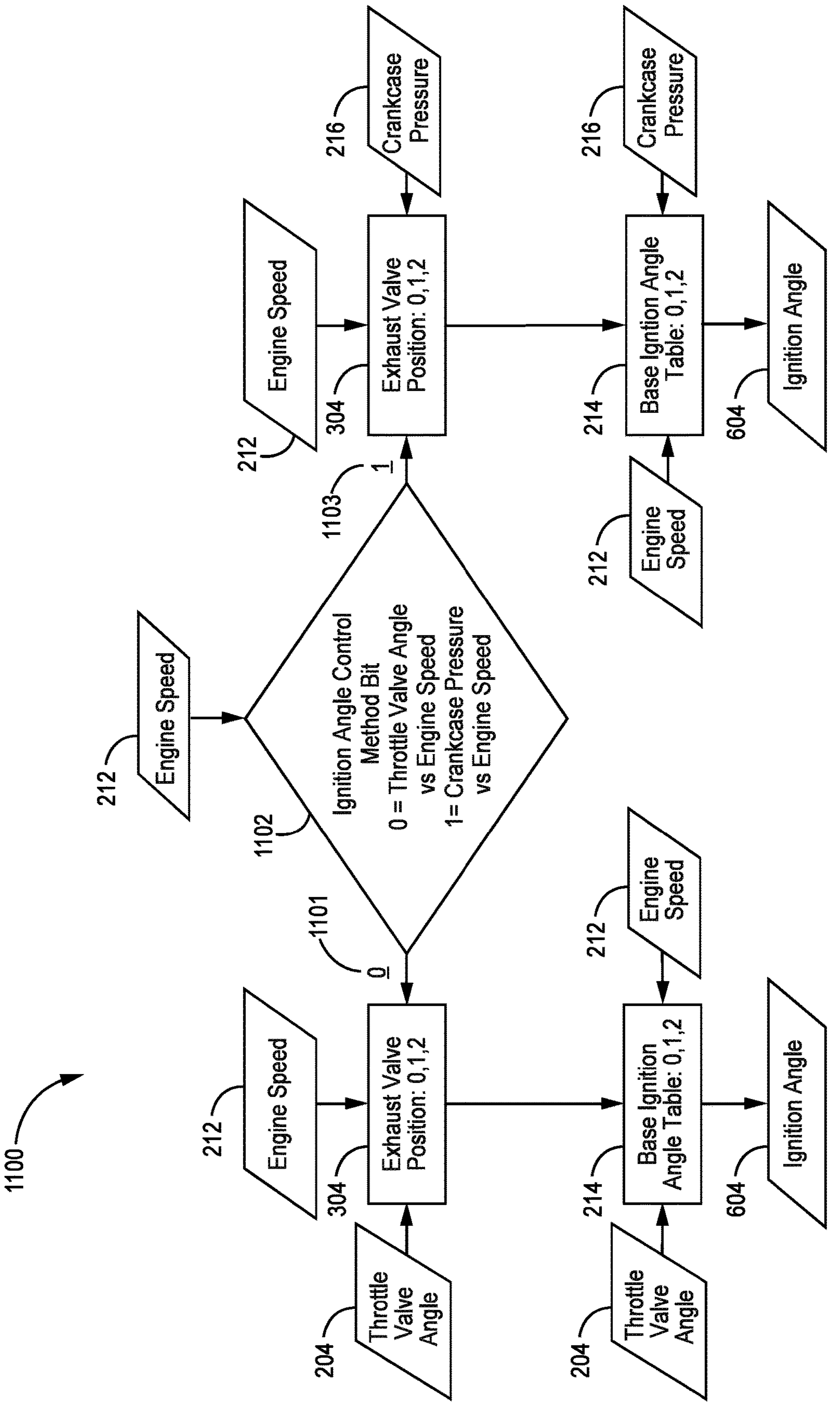
FIG. 11 illustrates a flow chart diagram 1100 of a method of controlling a two-stroke internal combustion engine, according to some embodiments of this disclosure.
Figure 12:
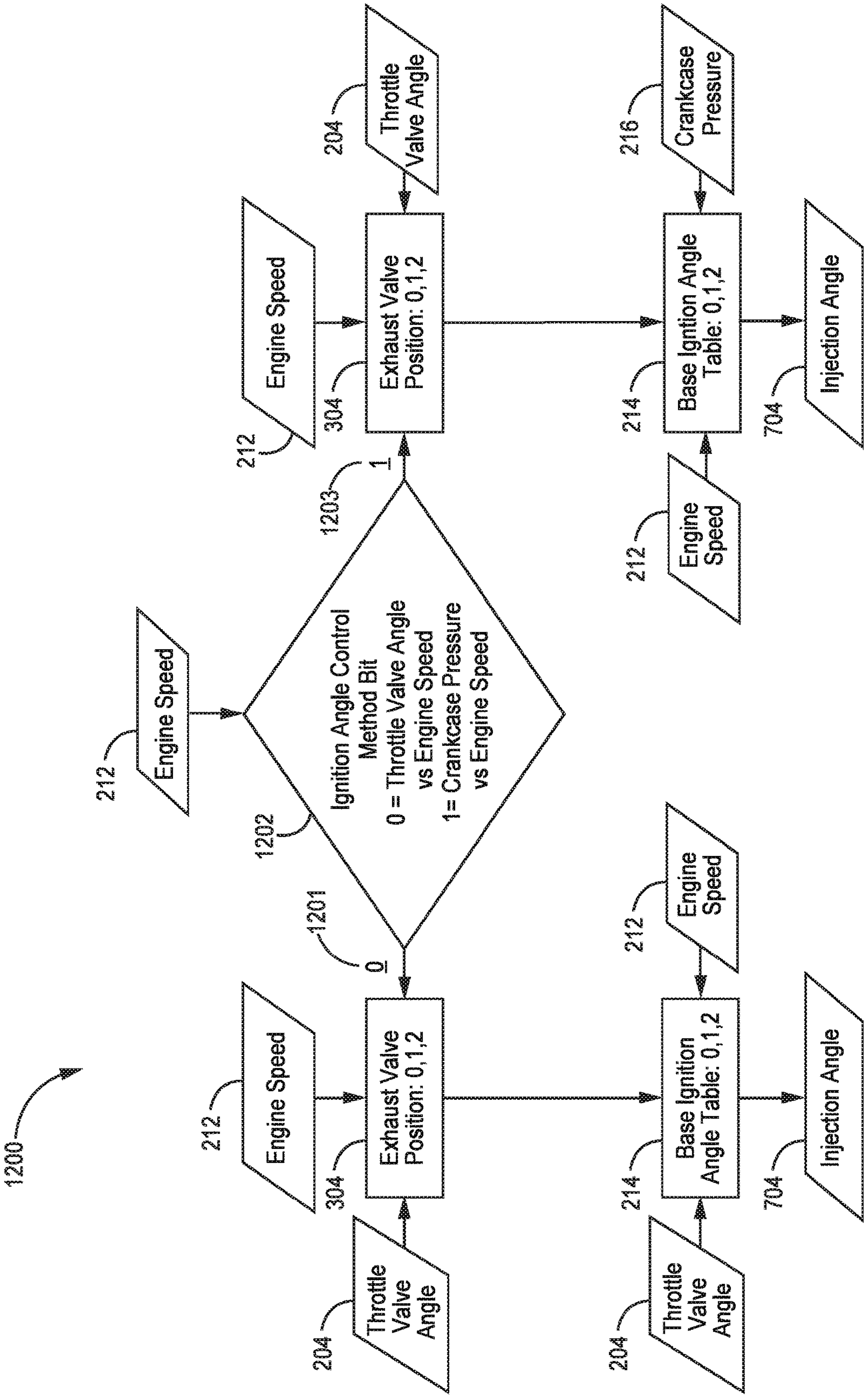
FIG. 12 illustrates a flow chart diagram 1200 of a method of controlling a two-stroke internal combustion engine, according to some embodiments of this disclosure.

Referring to FIG. 11, a flow chart diagram 1100 of a method of controlling a two-stroke internal combustion engine, according to some embodiments of this disclosure. Engine parameter input sets 1101, 1103 are selected by analysis 1102, in which engine speed 212 is an input, to obtain final injection angle 604. Set 1101 utilizes engine speed 212 and throttle valve angle 204 to determine exhaust valve position 304. The exhaust valve position 304 is then used in combination with engine speed 212 and throttle valve angle 204 to produce an injection angle 214 and final injection angle output 604. Set 1103 utilizes crankcase pressure 216 in place of throttle valve angle 204. FIG. 12 (see view 1200) uses similar inputs for set 1201 as set 1101, but with set 1203 in relation to 1103, a throttle valve angle 204 measurement is utilized in place of the crankcase pressure 204 to determine exhaust valve position 304. Analysis 1202 selects between the sets 1201, 1203 by relying on engine speed 212 as an input.

Figure 10:
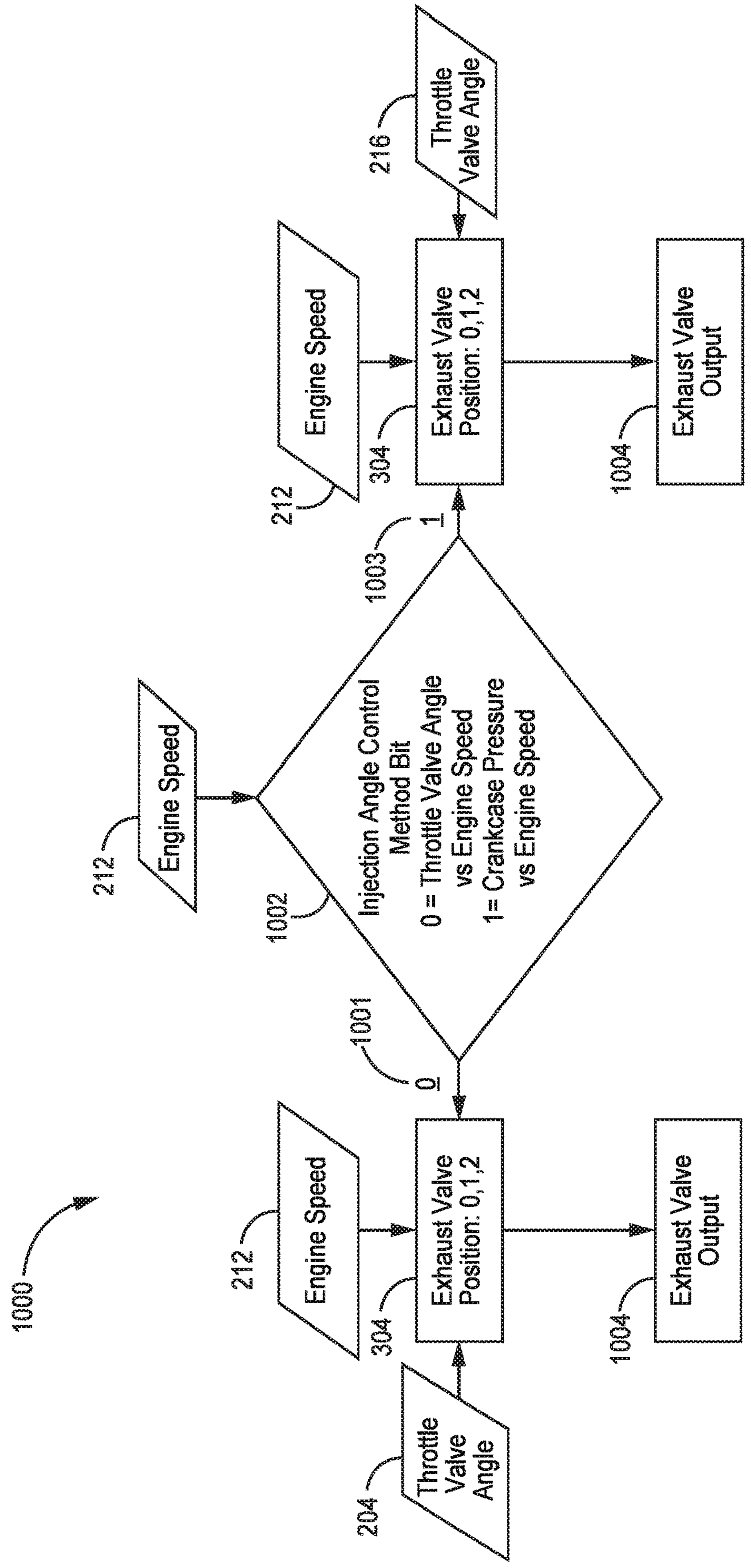
FIG. 10 illustrates a flow chart diagram 1000 of a method of controlling a two-stroke internal combustion engine, according to some embodiments of this disclosure.

Referring to FIG. 10, a flow chart diagram 1000 of a method of controlling a two-stroke internal combustion engine is shown, according to some embodiments of this disclosure. Engine speed 212 is used as an input for analysis 1002 between sets 1001 and 1003 for determining exhaust valve position 304. In set 1001, engine speed 212 and throttle valve position 204 are used as inputs. In set 1003, engine speed 212 and crankcase pressure 216 are utilized to determine exhaust valve position 304, and exhaust valve output 1004.

Figure 14:
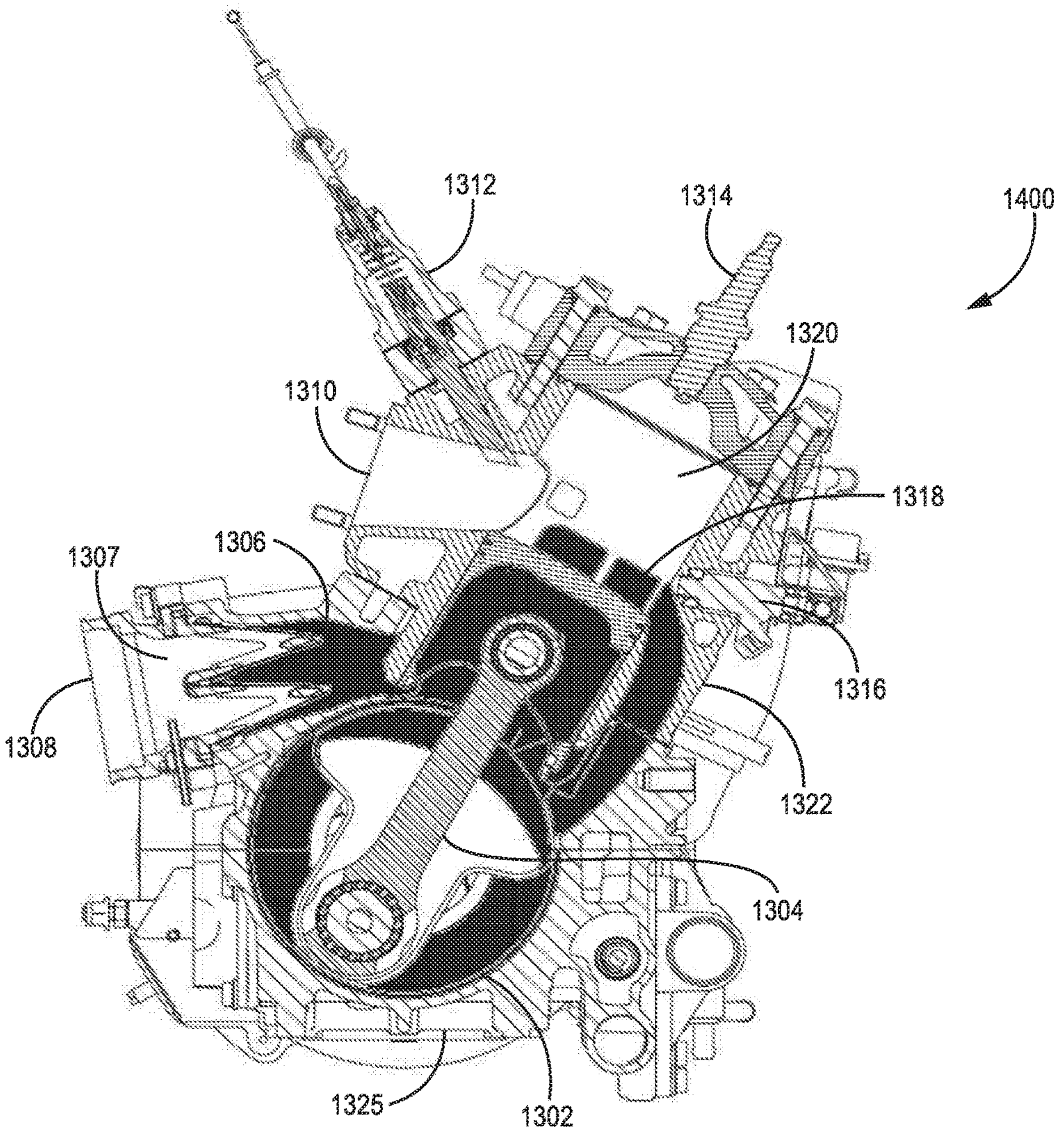
FIG. 14 illustrates a cross-sectional view 1400 of a two-stroke internal combustion engine, according to some embodiments of this disclosure.

Referring to FIG. 14, a cross-sectional view 1400 of a two-stroke internal combustion engine is shown, according to some embodiments of this disclosure. A crankcase 1302 holds a crankshaft 1304 which rotatably connects to piston 1322. An air intake passage 1308 receives air, such as from a turbocharger and fills crankcase volume 1306 (shown in black shading). An air intake valve 1327 may be positioned within the passage 1308. Transfer ports 1318 allow for air from the crankcase to move into the combustion chamber 1320 with fuel injected from fuel injection system 1316. The injection system 1316 may located in the cylinder or air intake passage and fluidly connected to the combustion chamber. In an alternative embodiment, the fuel injection system 1316 may be a direct injection into the combustion chamber. One or more spark plugs 1314, as part of an ignition system, ignite the fuel/air mixture in combustion chamber 1320 to force the piston 1322 downward, moving the crankshaft 1304. After combustion, air or air/fuel mixture or exhaust gases may exit via exhaust passage 1310 and if a boosted system, to the turbocharger. In an alternative embodiment, a supercharger is utilized in a boosted application. An exhaust valve 1312 is positioned in the exhaust passage 1310 to assist in controlling fluid flow out of the combustion chamber 1320. One or more air pressure sensors 1325 may be positioned in the crankcase 1302.

The intake valve 1327 may be a reed valve, for example. A throttle system, including a throttle valve, is mechanically and fluidly coupled to the air intake passage 1308. A turbocharger may be mechanically and fluidly couple to the air intake passage for compressing air entering the crankcase 1302. The position (i.e., angle) of the throttle valve can be used as an input as discussed above. The throttle valve is typically controlled by the user's input and measuring the position of the throttle valve assists in determining initial inputs to the engine analysis and also to the two or more sets of engine input parameters. The throttle valve may be positioned in 3 (i.e. open, partially open, and closed) positions, 4 positions, 5 positions, or a plurality of positions between fully open and fully closed.

The exhaust valve 1312 may be a guillotine valve, for example. The position of the exhaust valve 1312 can be utilized as both an input and output as discussed above. Measuring and controlling the position of the exhaust valve 1312 not only increases performance of the engine, but also assists in emission control by retaining some portion of unspent fuel within the combustion chamber. The exhaust valve 1312 may be positioned in 2 (i.e. open and closed) positions, 3 positions, 4 positions, or a plurality of positions between fully open and fully closed.

Figure 15A:
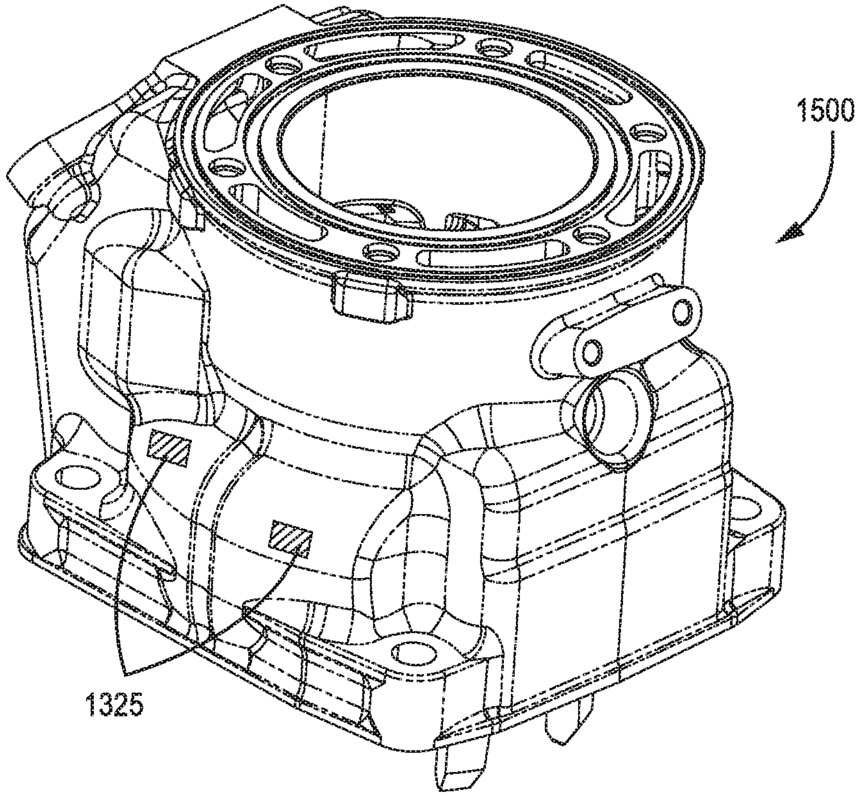
FIGS. 15A-B illustrate perspective views 1500, 1502 of a cylinder, according to some embodiments of this disclosure.
Figure 15B:
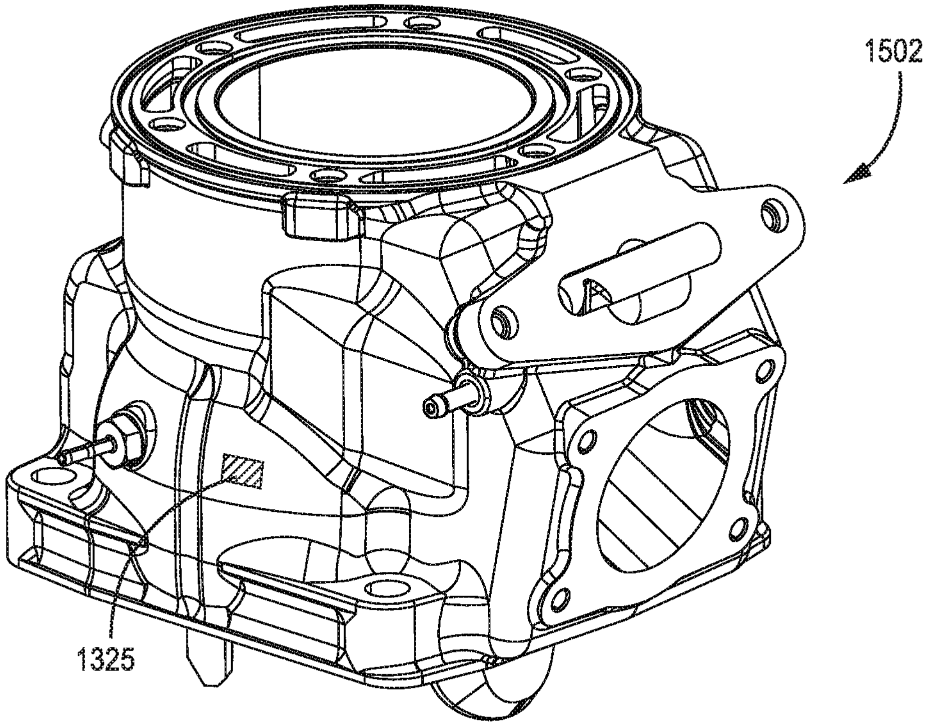

The one or more pressure sensors 1325 may be absolute pressure sensors, fluidly connected the two-stroke engine crankcase. The sensors 1325 may be located within the crankcase and either attached to or integrated with one or more walls of the crankcase area (see views 1500, 1502 of FIGS. 15A-B). The pressure sensor or sensors 1325 must be located such that they measure pressure within crankcase volume 1306. In some embodiments the pressure sensor is fluidly connected a transfer port passage 1318. The crankcase area may be defined as the area between the intake valve and the transfer port exits into the cylinder. In some embodiments, crankcase pressure is measured during the compression phase, or cycle, of the crankcase and further can be measured at one specific crankshaft position or at multiple crankshaft positions. The crankshaft positions at which measurements may be taken is defined by variables in the engine control unit. If multiple pressure measurements are taken per cycle, the measurements may be processed into an average and/or slope as a method of load determination. Pressure measurement(s) and/or processed measurement(s) may then become a reference value for determining: injection duration or amount, injection timing, ignition timing, exhaust valve position, electronic throttle valve position, engine indicated torque, fuel pressure control, or other engine parameter. The combination of crankcase and a pressure measurement upstream of the throttle, for example between the turbocharger compressor and engine throttle body, becomes a reference value for determining: wastegate valve position, air bypass valve position. In some embodiments this reference value is a ratio of crankcase pressure to upstream pressure. In some embodiments this reference value is the difference between crankcase pressure and upstream pressure.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto Various examples have been described. These and other examples are within the scope of the following claims.

What is claimed is:

1. A method of controlling a two-stroke internal combustion engine, comprising:
- sensing a plurality of engine parameter inputs;
- providing a first set of engine parameter inputs and a second set of engine parameter inputs;
- selecting between the first set of engine parameter inputs and the second set of engine parameter inputs, wherein the selection between the first set of engine parameter inputs and the second set of engine parameter inputs is based on whether an input value of engine speed is greater than or less than a pre-determined engine speed threshold;
- determining an engine output parameter from the selection; and
- utilizing the determined engine output parameter to control fuel injection,
- wherein the first set includes a direct measurement of crankcase pressure and engine speed, and the second set includes a throttle valve angle and the engine speed.

2. The method of claim 1, wherein selecting between the first set and the second set further includes:
- selecting between the first set, the second set, and a weighted value between 0.01 and 0.99 of the first set and the second set, wherein the selection is based on an input value of engine speed compared to a pre-determined threshold.

3. The method of claim 1, further comprising, before the selecting one set of two or more sets, the step of selecting driving fuel control or idle fuel control.

4. The method of claim 3, wherein selecting driving fuel control or idle fuel control comprises:
- determining one or more initial input values;
- comparing the one or more initial input values to one or more reference values, sufficient to determine whether the engine is in a drive mode or idle mode; and
- selecting driving fuel control or idle fuel control.

5. The method of claim 3, wherein the one or more reference values include reference throttle valve positions.

6. The method of claim 1, wherein the engine output parameter comprises one or more of fuel injection amount, fuel injection angle, ignition angle, boost pressure, wastegate duty, fuel pressure control, engine indicated torque, electronic throttle valve position, air bypass valve position, and exhaust valve position.

7. The method of claim 1, wherein the fuel injection includes one or more of injecting fuel, adjusting injection fuel angle, adjusting exhaust valve position, firing spark plug, adjusting throttle valve position, adjusting fuel pressure, adjusting boost pressure, and adjusting air bypass valve position.

8. The method of claim 1, further comprising determining a third set of engine parameter inputs.

9. The method of claim 8, wherein the third set of engine parameter inputs comprises engine speed in relation to barometric pressure.

10. The method of claim 3, wherein the one or more initial input values include throttle valve angle.

11. The method of claim 1, wherein each set of engine parameter inputs optionally includes one or more of barometric pressure, exhaust valve position, air temperature, engine coolant temperature, exhaust temperature, boost pressure, crankshaft position and direction of rotation, humidity, fuel pressure, fuel temperature, detonation sensor level, exhaust oxygen content, and throttle valve angle.

12. The method of claim 1, further comprising a third set of engine parameter inputs, the third set including an engine speed and one or more of crankcase pressure, barometric pressure, exhaust valve position, air temperature, engine coolant temperature, exhaust temperature, boost pressure, crankshaft position and direction of rotation, humidity, fuel pressure, fuel temperature, detonation sensor level, exhaust oxygen content, and throttle valve angle.

13. The method of claim 1, wherein one set of engine parameter inputs comprises engine speed in relation to both throttle valve angle and exhaust valve position.

14. The method of claim 1, wherein one set of engine parameter inputs comprises engine speed in relation to both crankcase pressure and exhaust valve position.

15. A method of controlling a two-stroke internal combustion engine, comprising:
- measuring an engine speed;
- measuring a direct crankcase pressure;
- utilizing the measured engine speed and the measured crankcase pressure to select between a first set of engine parameter inputs and a second set of engine parameter inputs, wherein the selection between the first set of engine parameter inputs and the second set of engine parameter inputs is based on whether the measured engine speed is greater than or less than a pre-determined engine speed threshold, wherein the first set of engine parameter inputs comprises the measured engine speed and the measured crankcase pressure, and the second set of engine parameter inputs comprises the measured engine speed and a throttle valve angle;
- utilizing either the first set of engine parameter inputs or the second set of engine parameter inputs to calculate an engine output parameter; and
- utilizing the engine output parameter to control fuel injection.

16. The method of claim 15, wherein the engine output parameter comprises one or more of fuel injection amount, fuel injection angle, ignition angle, boost pressure, wastegate duty, fuel pressure control, engine indicated torque, electronic throttle valve position, air bypass valve position, and exhaust valve position.

17. The method of claim 15, wherein the fuel injection includes one or more of injecting fuel, adjusting injection fuel angle, adjusting exhaust valve position, firing spark plug, adjusting throttle valve position, adjusting fuel pressure, adjusting boost pressure, and adjusting air bypass valve position.

18. The method of claim 15, wherein the first set of engine parameter inputs and the second set of engine parameter inputs optionally include one or more of barometric pressure, exhaust valve position, air temperature, engine coolant temperature, exhaust temperature, boost pressure, crankshaft position and direction of rotation, humidity, fuel pressure, fuel temperature, detonation sensor level, exhaust oxygen content, and the throttle valve angle.

19. The method of claim 15, wherein selecting between the first set of engine parameter inputs and the second set of engine parameter inputs further includes:
- selecting between the first set of engine parameter inputs, the second set of engine parameter inputs, and
- a weighted value between 0.01 and 0.99 of the first set of engine parameter inputs and the second set of engine parameter inputs, wherein the selection is based on an input value of engine speed compared to a pre-determined threshold.

20. The method of claim 19, wherein a sum of the weighted value of the first set of engine parameters inputs and the second set of engine parameter inputs is equal to 1.00.

21. The method of claim 15, wherein utilizing the measured engine speed and the measured crankcase pressure to select between a first set of engine parameter inputs, a second set of engine parameter inputs, or a weighted value of both the first set of engine parameters inputs and the second set of engine parameter inputs further comprises comparing the measured engine speed and the measured crankcase pressure to a threshold dataset.

22. The method of claim 21, wherein the threshold dataset comprises a weighting factor.

* * * * *